US010374909B2

(12) United States Patent
Kawai

(10) Patent No.: US 10,374,909 B2
(45) Date of Patent: Aug. 6, 2019

(54) SERVER FOR MANAGING STATUS OF SERVICE AGREEMENT WITH IMAGE-RECORDING DEVICE

(71) Applicant: Brother Kogyo Kabushiki Kaisha, Nagoya-shi, Aichi-ken (JP)

(72) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 167 days.

(21) Appl. No.: 15/185,077

(22) Filed: Jun. 17, 2016

(65) Prior Publication Data
US 2017/0063646 A1   Mar. 2, 2017

(30) Foreign Application Priority Data
Sep. 1, 2015   (JP) .................................. 2015-171982

(51) Int. Cl.
*G06F 15/173*   (2006.01)
*H04L 12/24*   (2006.01)
*H04L 29/06*   (2006.01)

(52) U.S. Cl.
CPC ...... *H04L 41/5025* (2013.01); *H04L 41/5012* (2013.01); *H04L 65/1063* (2013.01)

(58) Field of Classification Search
CPC ................ B41J 2/17503; B41J 2/17543; B41J 2/17546; B41J 2/17566; H04L 41/5025; H04L 41/5012; H04L 65/1063
USPC ....................................................... 709/224
See application file for complete search history.

(56) References Cited

U.S. PATENT DOCUMENTS

| 8,911,069 | B1 * | 12/2014 | Novak ................. B41J 2/17543 347/5 |
| 9,098,216 | B2 * | 8/2015 | Oleinik .............. H04N 1/00233 |
| 9,715,645 | B2 * | 7/2017 | Mccoog ............. G06K 15/4095 |
| 9,836,253 | B2 * | 12/2017 | Tomono ................. G06F 3/121 |
| 9,882,899 | B2 * | 1/2018 | Cunningham ........ H04L 9/0877 |
| 2003/0055732 | A1 * | 3/2003 | Nagata .................. G06Q 10/06 705/22 |

(Continued)

FOREIGN PATENT DOCUMENTS

JP   2006-139725 A   6/2006

OTHER PUBLICATIONS

HP. "HP Instant Ink Frequently Asked Questions". Aug. 1, 2015. pp. 1-4. (Year: 2015).*

*Primary Examiner* — Imad Hussain
(74) *Attorney, Agent, or Firm* — Banner & Witcoff, Ltd.

(57) ABSTRACT

In a server, a storage is configured to store status of a service agreement for delivering a cartridge with an image-recording device. For the image-recording device, the cartridge is available in a first mode and is unavailable in a second mode. The status includes a first status indicating that the service agreement has been in force and a second status indicating that the service agreement has been canceled. The storage is further configured to store instructions causing the server to receive a cancellation request of the service agreement from an information processor; transmit a switch command to switch an operating mode of the image-recording device from the first to second mode in response to the cancellation request; and change the status stored in the storage to the second status in response to receiving a response indicating that the operating mode has been switched from the first to second mode.

13 Claims, 19 Drawing Sheets

(56) References Cited

U.S. PATENT DOCUMENTS

| | | | | |
|---|---|---|---|---|
| 2011/0246637 A1* | 10/2011 | Murakanni | H04W 84/20 | 709/223 |
| 2011/0311239 A1* | 12/2011 | Kewai | G03G 15/5079 | 399/12 |
| 2011/0311243 A1* | 12/2011 | Kawai | G03G 15/5079 | 399/28 |
| 2012/0014700 A1* | 1/2012 | Matsumoto | G03G 15/556 | 399/12 |
| 2012/0014701 A1* | 1/2012 | Tokuno | G03G 15/5079 | 399/12 |
| 2012/0027423 A1* | 2/2012 | Kawai | G03G 15/556 | 399/12 |
| 2012/0027424 A1* | 2/2012 | Kawai | G03G 15/5079 | 399/12 |
| 2014/0375708 A1* | 12/2014 | Novak | B41J 2/17546 | 347/5 |
| 2016/0011554 A1* | 1/2016 | Shipman | G06F 21/10 | 399/79 |
| 2016/0011827 A1* | 1/2016 | Webb | G06F 3/1203 | 358/1.14 |
| 2016/0082740 A1* | 3/2016 | Jeran | B41J 2/17546 | 358/1.14 |
| 2016/0164868 A1* | 6/2016 | Cunningham | H04L 9/0877 | 726/7 |
| 2016/0292550 A1* | 10/2016 | Kawai | G06K 15/402 | |
| 2017/0057267 A1* | 3/2017 | Elgee | B41J 2/17546 | |
| 2017/0090830 A1* | 3/2017 | Tomono | G06F 3/121 | |
| 2017/0161719 A1* | 6/2017 | Bhatia | G06Q 20/18 | |
| 2017/0374209 A1* | 12/2017 | Kawakami | G03G 15/553 | |

\* cited by examiner

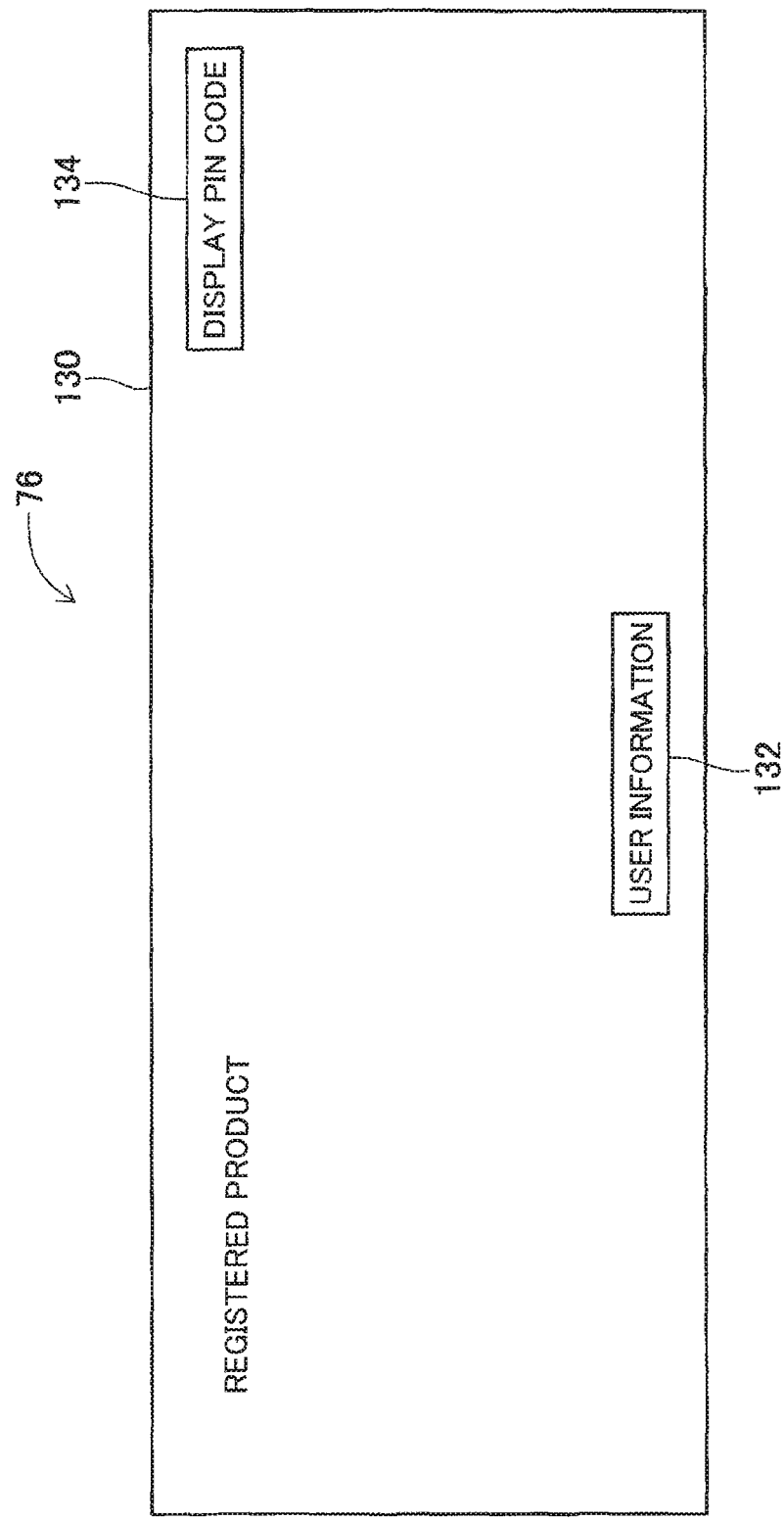

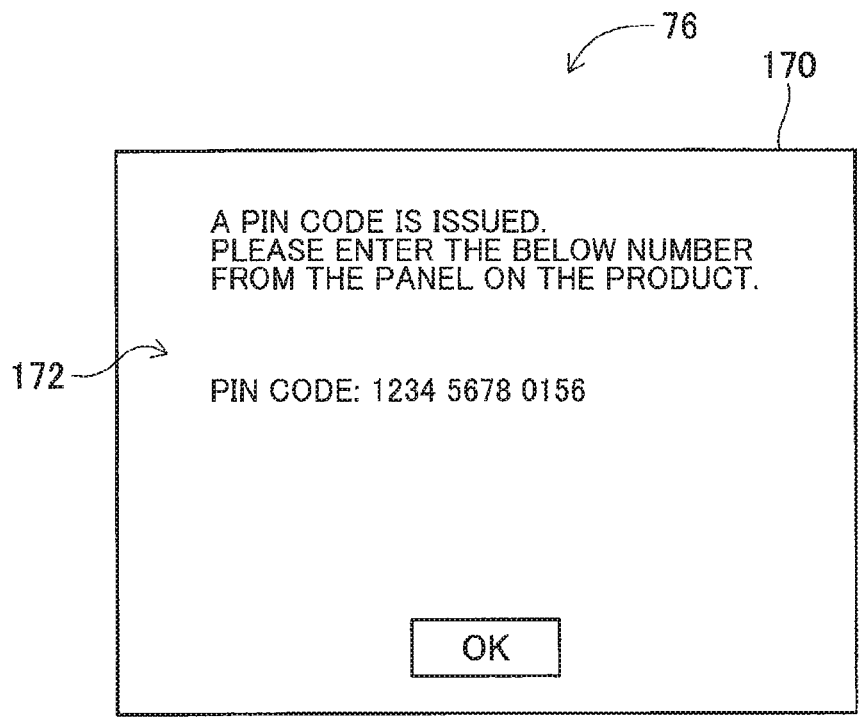
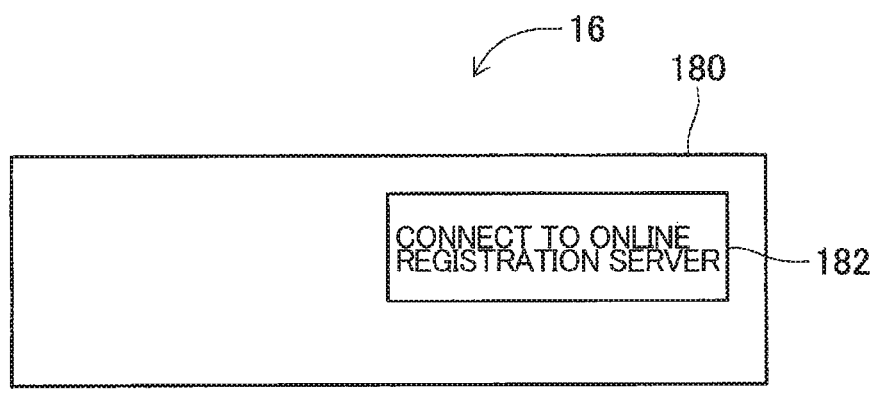

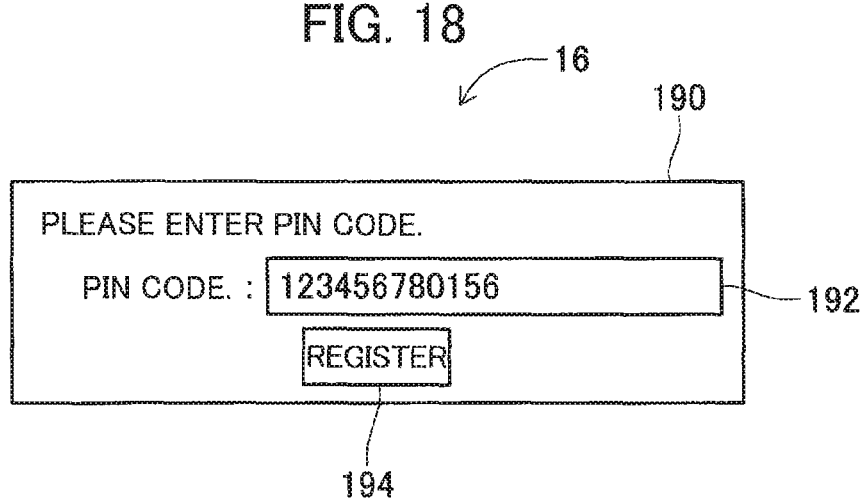
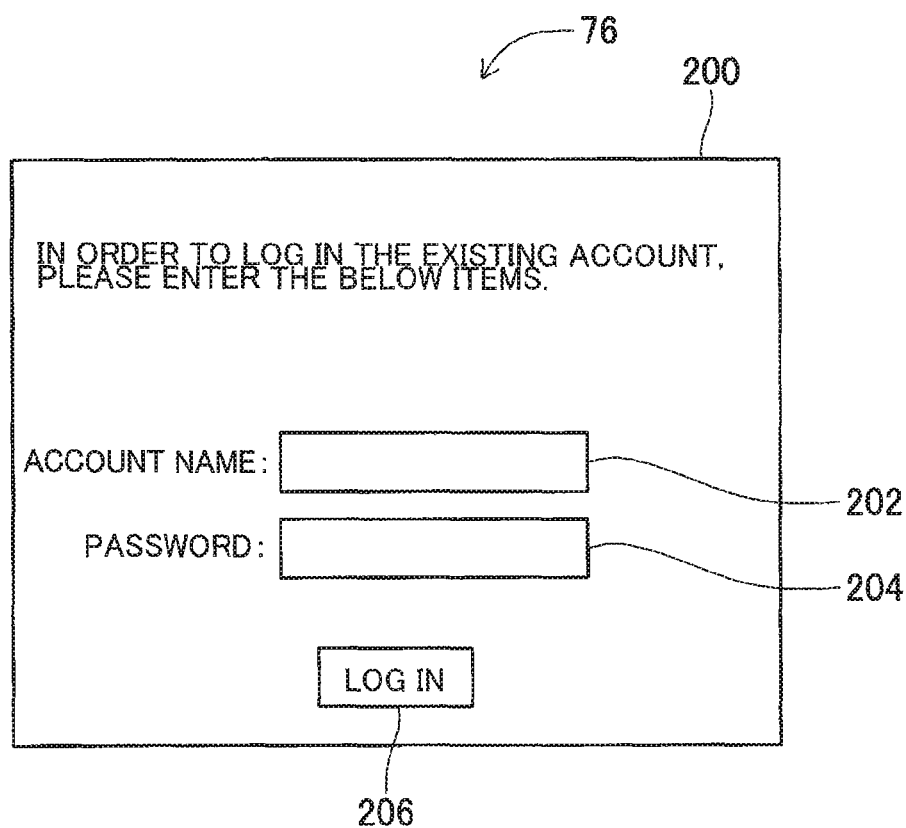

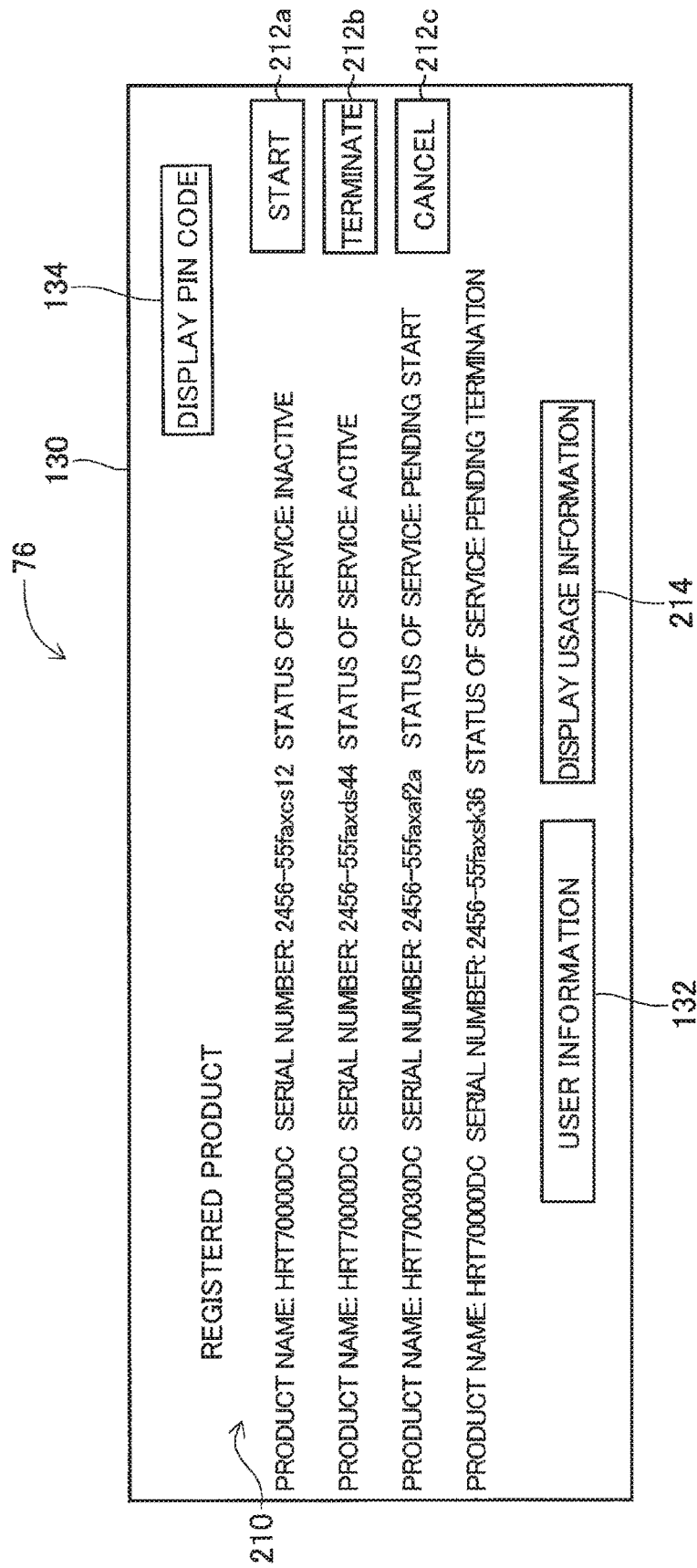

SERVER FOR MANAGING STATUS OF SERVICE AGREEMENT WITH IMAGE-RECORDING DEVICE

CROSS REFERENCE TO RELATED APPLICATION

This application claims priority from Japanese Patent Application No. 2015-171982 filed on Sep. 1, 2015. The entire content of the priority application is incorporated herein by reference.

TECHNICAL FIELD

The present disclosure relates to a server for managing the status of service agreements with image-recording devices.

BACKGROUND

Image-recording devices known in the art record images by depositing recording material on recording paper. Often the recording material is supplied in the form of cartridges. In recent years, manufacturers of such cartridges have provided a service for delivering cartridges containing the recording material to the users of the image-recording devices. While such services are provided for image-recording devices, a personal computer or other information processor can be used to enter new service agreements, cancel agreements, and the like. A communication system configured of client terminals such as image-recording devices, and an administrative server connected to the client terminals over a network is known.

SUMMARY

When the target of a service is an image-recording device and a personal computer or other information processor is used to enter a new service agreement, cancel an agreement, and the like, the information processor transmits information related to the service agreement to the administrative server. The administrative server then transmits instructions in accordance with the service agreement to the image-recording device, and the status of the image-recording device is set based on the status of the service agreement. However, the timing at which changes to the agreement status go into effect is not clear when the administrative server is unable to communicate with the image-recording device despite the information processor having transmitted information related to the agreement to the administrative server. In view of the foregoing, it is an object of the present disclosure to provide a server and system capable of clearly defining the timing at which the cancellation of a service agreement with an image-recording device goes into effect.

In order to attain the above and other objects, one aspect provides a server that includes a storage; a communication interface; and a processor. The storage is configured to store status of a service agreement with an image-recording device. The service agreement is an agreement for delivering a specific type of cartridge attachable to the image-recording device. The status of the service agreement includes a first status and a second status. The first status indicates that the service agreement has been in force. The second status indicates that the service agreement has been canceled. The storage is further configured to store instructions, when executed by the processor, causing the server to: output a delivery command to deliver the specific type of cartridge when remaining quantity of recording material contained in the specific type of cartridge in use has reached a predetermined minimum under the first status of the service agreement stored in the storage; receive a cancellation request of the service agreement from an information processor through the communication interface; transmit a switch command to switch an operating mode of the image-recording device from a first mode to a second mode through the communication interface in response to at least the cancellation request, the specific type of cartridge being available for the image-recording device in the first mode, the specific type of cartridge being unavailable for the image-recording device in the second mode; and change the status of the service agreement stored in the storage to the second status in response to receiving a response through the communication interface, the response indicating that the operating mode of the image-recording device has been switched from the first mode to the second mode according to the switch command.

According to another aspect, another aspect provides a system that includes a server; and an image-recording device. The server includes: a first storage; a first communication interface; and a processor. The first storage is configured to store status of a service agreement with the image-recording device. The service agreement is an agreement for delivering a specific type of cartridge attachable to the image-recording device. The status of the service agreement includes a first status and a second status. The first status indicates that the service agreement has been in force. The second status indicates that the service agreement has been canceled. The storage is further configured to store instructions, when executed by the processor, causing the server to: output a delivery command to deliver the specific type of cartridge when remaining quantity of recording material contained in the specific type of cartridge in use has reached a predetermined minimum under the first status of the service agreement stored in the first storage; receive a cancellation request of the service agreement from an information processor through the first communication interface; transmit a switch command to switch the operating mode of the image-recording device from a first mode to a second mode through the first communication interface in response to at least the cancellation request, the specific type of cartridge being available for the image-recording device in the first mode, the specific type of cartridges being unavailable for the image-recording device in the second mode; and change the status of the service agreement stored in the first storage to the second status in response to receiving a response through the first communication interface, the response indicating that the operating mode of the image-recording device has been switched from the first mode to the second mode according to the switch command. The image-recording device is selectively operable in a plurality of operating modes. The image-recording device includes a connector; a recorder; a second storage; a second communication interface; and a controller. The specific type of cartridge is detachably attachable to the connector. The recorder is configured to record an image onto a recording medium by making recording material adhere onto the recording medium. The controller is configured to: store in the second storage consumption information of the recording material contained in the specific type of cartridge attached to the connector; transmit the consumption information stored in the second storage through the second communication interface; and switch the operating mode from the first mode to the second mode in response to the switch command received from the second communication interface.

BRIEF DESCRIPTION OF THE DRAWINGS

The particular features and advantages of the disclosure as well as other objects will become apparent from the following description taken in connection with the accompanying drawings, in which:

FIG. 15 is a schematic diagram illustrating a registration information page displayed on the display of the PC;

FIG. 16 is a schematic diagram illustrating a code displaying page displayed on the display of the PC;

FIG. 17 is a schematic diagram illustrating a connection screen displayed on a display of the printer;

FIG. 18 is a schematic diagram illustrating code registration screen displayed on the display of the printer;

FIG. 19 is a schematic diagram illustrating a login page displayed on the display of the PC;

FIG. 20 is a schematic diagram illustrating a registration information page displayed on the display of the PC;

DETAILED DESCRIPTION

<Structure of a Communication System>

Figure 1:
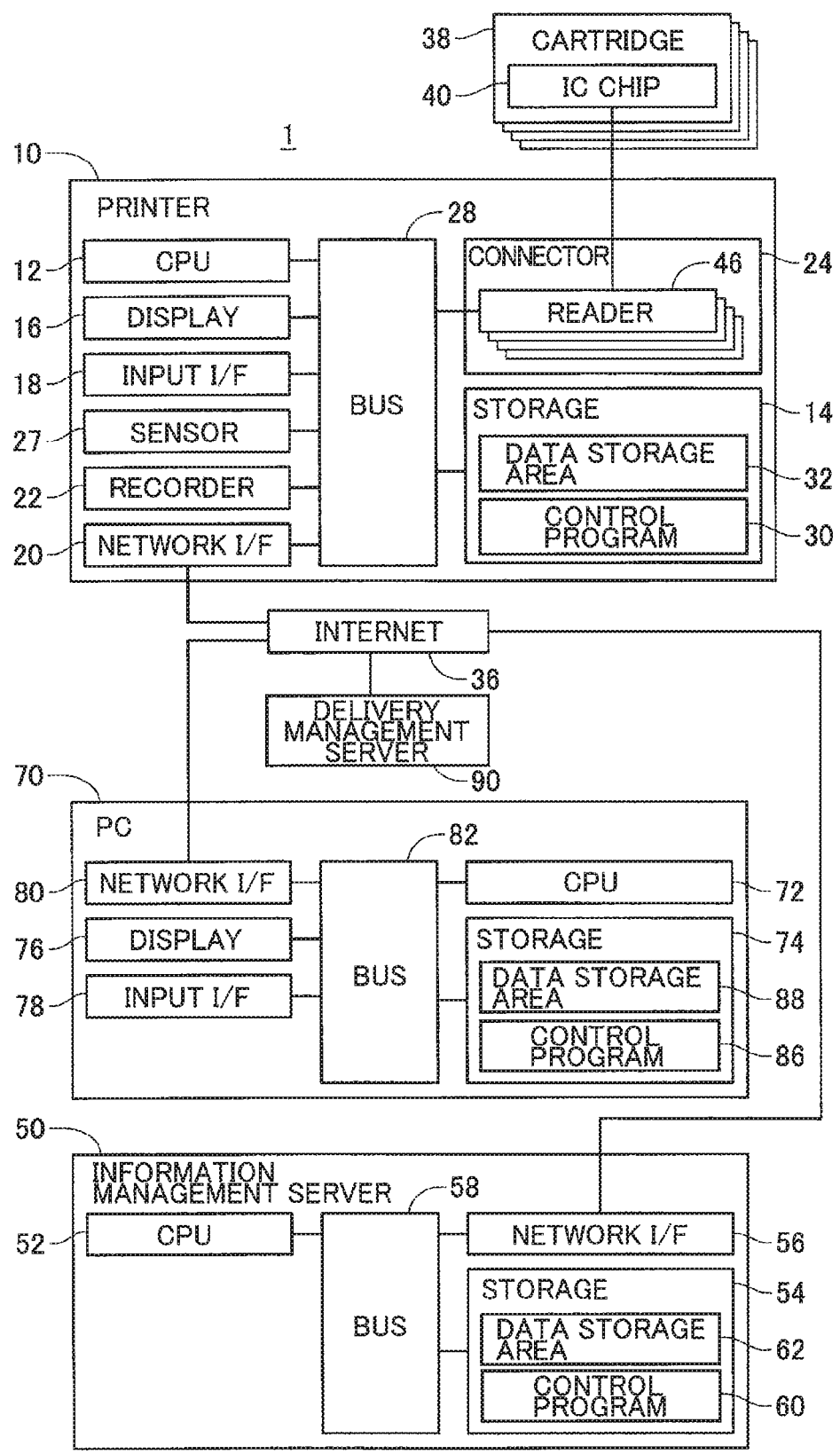
FIG. 1 is a block diagram showing a communication system according to an embodiment of the present disclosure.
Figure 2:
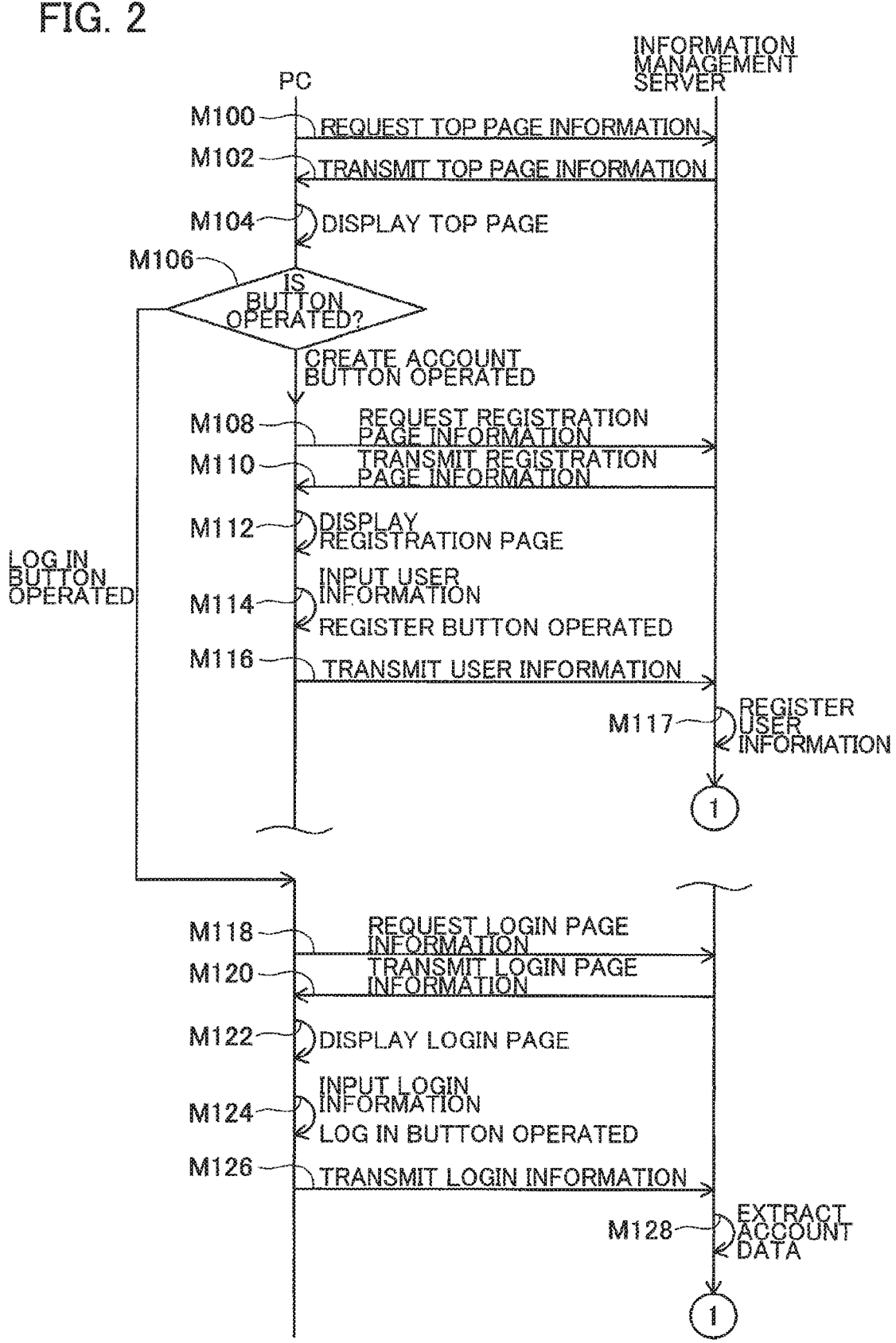
FIG. 2 is a sequence chart illustrating an operating state of the communication system according to the embodiment.

FIG. 1 is a block diagram showing a communication system 1 (an example of the claimed system) serving as an embodiment of the present disclosure. The communication system 1 includes a printer 10 (an example of the claimed image-recording device), an information management server 50 (an example of the claimed server), a personal computer 70 (PC; an example of the claimed information processor), and a delivery management server 90.

The printer 10 is primarily provided with a central processing unit 12 (CPU; an example of the claimed controller), a storage 14, a display 16, an input interface 18, a network interface 20 (an example of the claimed second communication interface), a recorder 22 (an example of the claimed recorder), a connector 24 (an example of the claimed connector), and sensors 27. These components can communicate with each other via a bus 28.

The CPU 12 executes processes according to a control program 30 stored in the storage 14. The control program 30 is a program for executing a printing process using the printer 10. Here, the storage 14 is configured of a combination of memory that includes RAM (random access memory), ROM (read-only memory), flash memory, a hard disk drive, and a buffer provided in the CPU 12. The storage 14 is also provided with a data storage area 32 (an example of the claimed second storage). The data storage area 32 serves to store data and the like required when executing the control program 30.

The display 16 displays various screens based on inputted image data. The display may be configured of, but is not limited to, a liquid crystal display (LCD) or an organic electroluminescent (EL) display. The input interface 18 is configured of keys for instructing the execution of various functions possessed by the printer 10. For example, the input interface 18 may be a touchscreen integrally configured with the display 16 that accepts user operations corresponding to icons displayed on the display 16. Alternatively, the input interface 18 may be configured of hardware keys and the like rather than a touchscreen.

The network interface 20 communicates with external devices. The network interface 20 connects to the information management server 50 and the like via an internet 36. Through the network interface 20, the printer 10 can perform data communications with the information management server 50 and the like.

The recorder 22 is a printing mechanism, such as an inkjet head. The CPU 12 inputs drive signals into the recorder 22. When configured of an inkjet head, the recorder 22 ejects ink from nozzles in response to the inputted drive signals.

The connector 24 is formed in the enclosure constituting the printer 10. The connector 24 can be connected to a cartridge 38 that is filled with ink used by the recorder 22. Here, the connector 24 may allow the connection of a plurality of cartridges 38 filled with ink of different colors. An IC chip 40 is attached to each cartridge 38. The IC chip 40 stores ID information for identifying the corresponding cartridge 38. The connector 24 is also provided with readers 46 that respectively read the ID information from the IC chips 40 on the corresponding cartridges 38 connected to the connector 24. The sensors 27 respectively detect the amount of ink remaining in cartridges 38 connected to the connector 24.

The information management server 50 is primarily provided with a CPU 52 (an example of the claimed processor), a storage 54, and a network interface 56 (an example of the claimed communication interface and first communication interface). These components can communicate with each other via a bus 58.

The CPU 52 executes processes according to a control program 60 stored in the storage 54. The control program 60 functions to manage information related to printing processes performed by the printer 10. The storage 54 is configured of a combination of memory that includes RAM, ROM, flash memory, a hard disk drive, a buffer provided in the CPU 52, and the like. The storage 54 is also provided with a data storage area 62 (an example of the claimed storage and first storage). The data storage area 62 stores information related to printing processes performed on the printer 10, and data and the like required for executing the control program 60.

The network interface 56 functions to communicate with external devices. The network interface 56 is connected to the printer 10, PC 70, and delivery management server 90 over the internet 36. Through the network interface 56, the information management server 50 can perform data communications with the printer 10, PC 70, and delivery management server 90.

The PC 70 is primarily provided with a CPU 72, a storage 74, a display 76, an input interface 78, and a network interface 80. These components can communicate with each other via a bus 82.

The CPU 72 executes processes according to a control program 86 stored in the storage 74. The control program 86 functions to enforce agreements for fixed-rate printing to be described later. The storage 74 is configured of a combination of memory that includes RAM, ROM, flash memory, a hard disk drive, a buffer provided in the CPU 72, and the like. The storage 74 also includes a data storage area 88. The data storage area 88 stores data and the like required for executing the control program 86.

The display 76 displays various pages according to inputted image data. The display 76 may be configured of, but is not limited to, an LCD or an organic EL display. The input interface 78 is configured of keys for instructing the execution of various functions possessed by the PC 70 and may be configured of hardware keys, such as a keyboard, mouse, and the like. Alternatively, the input interface 78 may be a touchscreen integrally configured with the display 76 that accepts user operations corresponding to icons displayed on the display 76.

The network interface 80 functions to communicate with external devices. The network interface 80 is connected to the information management server 50 and the like via the internet 36. Through the network interface 80, the PC 70 can perform data communications with the information management server 50 and the like.

<Fixed-Rate Printing using the Communication System>

The communication system 1 according to the embodiment can implement fixed-rate printing on the printer 10. Fixed-rate printing enables the printer 10 to print a preset number of pages at a fixed price within a prescribed period of time over the term of agreement. For example, if the user enters an agreement with a manufacturer offering a fixed-rate printing service that allows the user to use the printer 10 which performs fixed-rate printing at a prescribed cost, the manufacturer delivers special cartridges to the user. In the present embodiment, fixed-rate printing is defined as printing using special cartridges delivered from the manufacturer. The printer 10 acquires information related to the quantities of residual ink in its cartridges and transmits this information to the information management server 50. The information management server 50 then manages the cartridges used by the printer 10 based on the information received from the printer 10. When the quantity of ink in a cartridge used by the printer 10 falls below a threshold value, the information management server 50 outputs a command to ship a new special cartridge to the user of the printer 10. The information management server 50 outputs these commands without limitation, i.e., any number of times whenever the quantity of ink in a cartridge falls below the threshold value. As an example, the user can use the printer 10 at the fixed rate until the printer 10 prints up to 200 pages within a single month using these special cartridges. If the number of pages printed exceeds 200, the user must pay a surcharge in addition to the fixed rate.

However, since the manufacturer delivers the special cartridges for fixed-rate printing (an example of the claimed specific type of cartridge) only after the user has entered an agreement for fixed-rate printing, a certain amount of time elapses from the moment that the agreement is made until the special cartridges reach the user, during which time the user is unable to execute fixed-rate printing. In other words, the service for fixed-rate printing is in a holding state (hereinafter referred to as a "pending start" state) for a period beginning from the moment that the agreement for fixed-rate printing was entered until the special cartridges are delivered to the user and connected to the connector 24. Once the special cartridges are connected to the connector 24, the service for fixed-rate printing becomes available (hereinafter referred to as an "active" state), and the printer 10 can execute fixed-rate printing processes. The prescribed period of the agreement described above begins when the user first connects the special cartridges to the connector 24. Thereafter, the user may perform a procedure to cancel the agreement for fixed-rate printing at any time. By doing so, the agreement pertaining to the service for fixed-rate printing is canceled and the service is no longer available to the printer 10 (hereinafter called an "inactive" state).

In addition to fixed-rate printing processes, the printer 10 is capable of executing normal printing processes. A normal printing process is a process executed with normal cartridges (as an example of the claimed general type of cartridge) included with the printer 10 or sold at retail stores and the like when the normal cartridges are connected to the connector 24 in place of the special cartridges delivered under the agreement for fixed-rate printing.

The printer 10 has an operating mode for executing normal printing processes (hereinafter called a "second mode"), and a different operating mode for executing fixed-rate printing processes (hereinafter called a "first mode"). In the second mode, the printer 10 is prohibited from executing a printing process when special cartridges are connected to the connector 24 and can only execute printing processes when normal commercially available cartridges are connected to the connector 24. This mode is provided to prevent the execution of unauthorized printing processes. For example, if a user not under contract for fixed-rate printing obtains special cartridges illegally, this mode can prevent the user from executing printing processes with these special cartridges. Hence, operations of the printer 10 are controlled according to the second mode during normal printing processes.

In order to prevent the execution of unauthorized printing processes, the execution of normal printing processes on the printer 10 is prohibited when even one special cartridge is connected to the connector 24. In other words, a printing process in the second mode can only be executed when all cartridges connected to the connector 24 are normal cartridges. The printer 10 determines whether each of the cartridges connected to the connector 24 is a special cartridge or a normal cartridge based on the ID information read by the corresponding reader 46.

On the other hand, in the first mode for executing fixed-rate printing processes, the user is under agreement to pay the fee required for executing such fixed-rate printing processes. Hence, the printer 10 is allowed to perform printing processes when the special cartridges are connected to the connector 24 in the first mode. However, since the printer can print only up to the preset number of pages at the fixed rate in fixed-rate printing, the printer 10 counts the number of pages printed in each printing process performed while special cartridges are connected to the connector 24.

Further, in the first mode the printer 10 is allowed to perform printing processes even when all cartridges connected to the connector 24 are normal commercially available cartridges. This reduces the economic burden on the user. That is, a user of the fixed-rate printing service is charged for each printed page that exceeds the preset number of pages in the prescribed period, regardless of whether such printing processes are executed within the term of agreement. For this reason, the printer 10 is allowed to execute printing processes in the first mode, even when all special cartridges have been removed from the connector 24 and only normal cartridges are connected to the connector 24. Moreover, the printer 10 does not count the number of pages printed during printing processes performed when only normal cartridges are connected to the connector 24 as pages in fixed-rate printing. In this way, the user can avoid paying surcharges for printing processes executed after exceeding the number of preset pages for fixed-rate printing, thereby reducing the user's economic burden. Hence, the printer 10 executes all printing processes in the first mode regardless of the type of cartridge connected to the connector 24, and counts only those pages printed when special cartridges are connected to the connector 24 as pages printed under the fixed-rate printing service. Next, the procedure for entering an agreement for fixed-rate printing and for canceling the agreement will be described while referring to the sequence charts shown in FIGS. 2 through 6.

Figure 12:
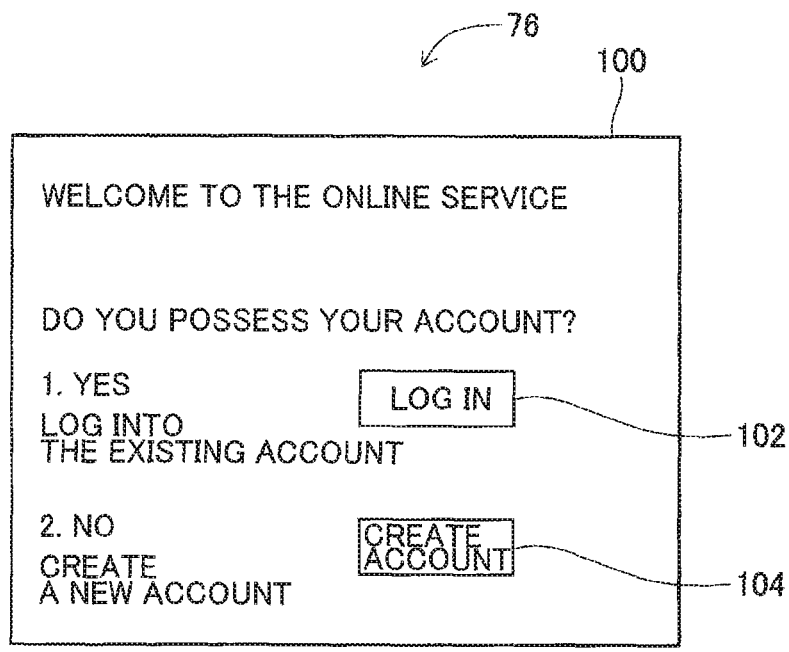
FIG. 12 is a schematic diagram illustrating a top page displayed on a display of a PC.

A user wishing to enter an agreement for fixed-rate printing first uses the PC 70 to access the web server of the manufacturer offering the fixed-rate printing service. In the communication system 1 of the present embodiment, the information management server 50 constitutes the web server of the manufacturer offering this fixed-rate printing service. Upon accessing the information management server 50, the PC 70 requests top page information (see FIG. 2) from the information management server 50 (M100). In response to this request, the information management server 50 transmits the top page information to the PC 70 (M102). Upon receiving the top page information, the PC 70 displays a top page 100 shown in FIG. 12 on the display 76 based on the received information (M104).

Figure 13:
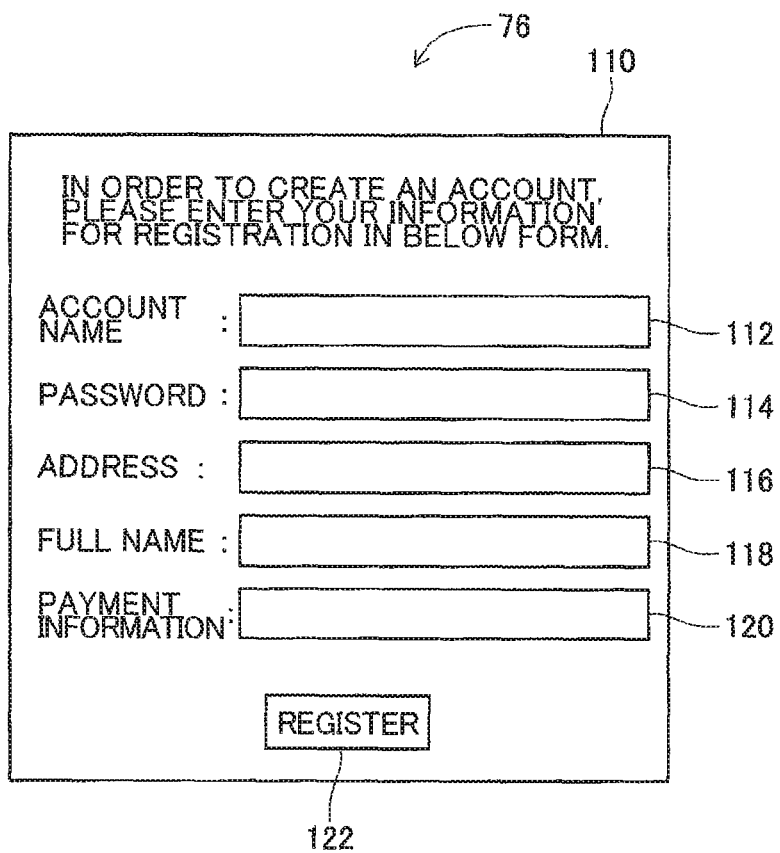
FIG. 13 is a schematic diagram illustrating a registration page displayed on the display of the PC.

A LOG IN button 102 and a CREATE ACCOUNT button 104 are also displayed in the top page 100. The user of the PC 70 selects the LOG IN button 102 when the user possesses an account used to enter agreements for fixed-rate printing. However, when not possessing an account used to enter agreements for fixed-rate printing, the user selects the CREATE ACCOUNT button 104 to create an account. When a user who does not possess an account operates the CREATE ACCOUNT button 104 in the top page 100 (M106: CREATE ACCOUNT BUTTON OPERATED), the PC 70 issues a request to the information management server 50 for registration page information (M108). In response to this request, the information management server 50 transmits the registration page information to the PC 70 (M110). Upon receiving the registration page information, the PC 70 displays a registration page 110 shown in FIG. 13 on the display 76 based on the received information (M112).

Five text entry boxes 112-120 and a REGISTER button 122 are displayed in the registration page 110. The text entry boxes 112-120 are entry fields for inputting an account name, password, address, full name, and payment information, respectively. The payment information is information related to a credit card or the like. After inputting the account name and the like in the five text entry boxes 112-120, the user operates the REGISTER button 122 (M114), instructing the PC 70 to transmit the information inputted into the text entry boxes 112-120 (hereinafter also referred to as "user information") to the information management server 50 (M116). Upon receiving the user information, the information management server 50 stores this information in the data storage area 62 (M117). Accordingly, this user information is registered in the information management server 50 as account data.

Figure 14:
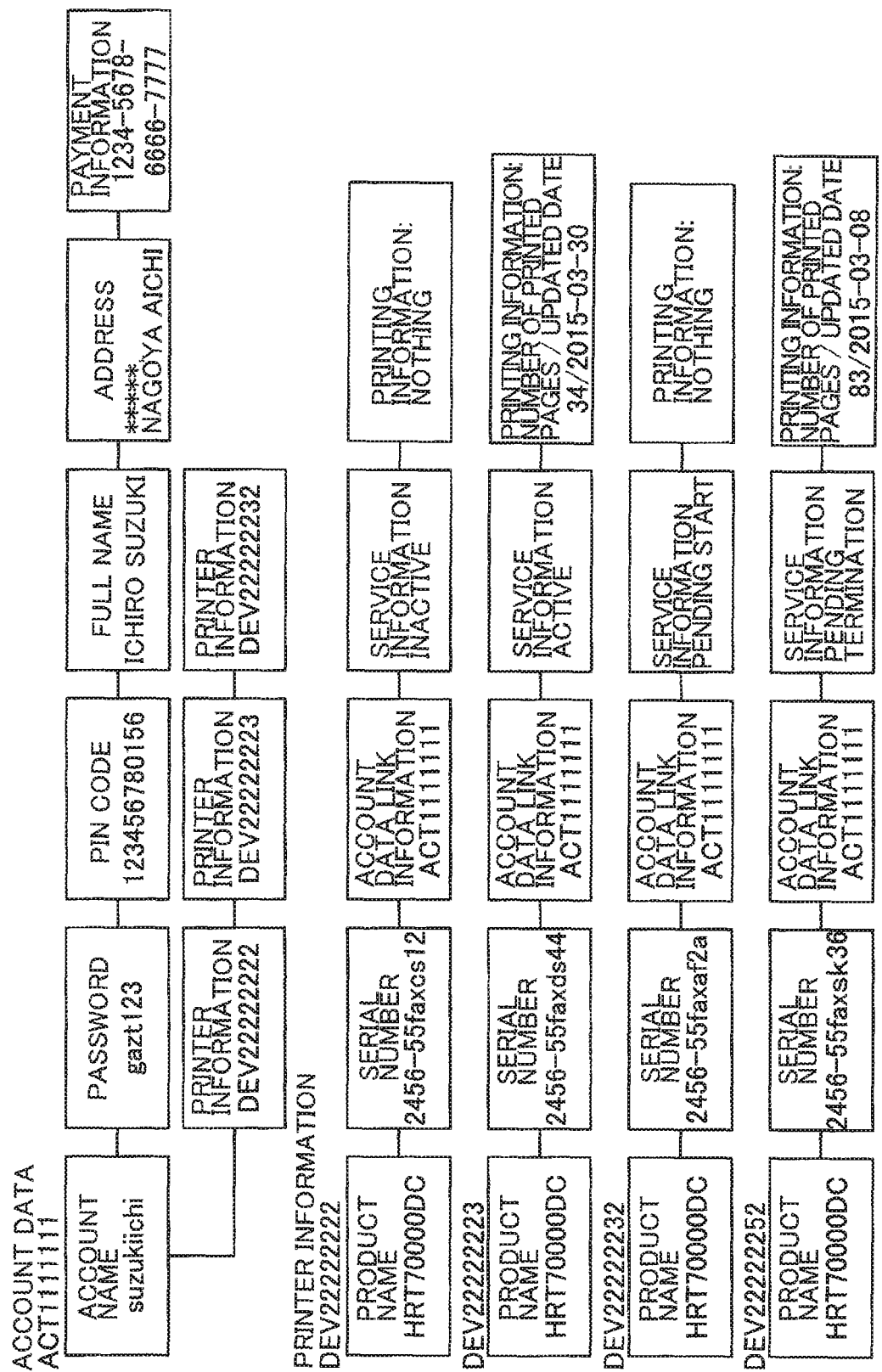
FIG. 14 is a schematic diagram conceptually illustrating account data stored in the information management server according to the embodiment.

As shown in FIG. 14, account data is configured of user information (account name, password, address, full name, and payment information), information related to a PIN code (hereinafter referred to as "code information"), and information related to printers (hereinafter referred to as "printer information"). However, when the user information is registered as account data through operation of the CREATE ACCOUNT button 104 in the top page 100, only the user information is stored in the data storage area 62 as account data, while the code information and printer information are not.

When only user information is stored in the data storage area 62 as account data in this way (M117), information for displaying a page based on the information registered as account data (hereinafter called the "registration information page") on the display 76 is created on the information management server 50 (M129 in FIG. 3). The information management server 50 subsequently transmits this registration information page information to the PC 70 (M130). Upon receiving the registration information page information, the PC 70 displays a registration information page 130 shown in FIG. 15 on the display 76 based on this information (M132).

A USER INFORMATION button 132 and a DISPLAY CODE button 134 are displayed in the registration information page 130. The USER INFORMATION button 132 is selected to view the user information registered on the information management server 50. When the user selects the USER INFORMATION button 132, the user information that was stored in the data storage area 62 in M117 is displayed on the display 76. The DISPLAY CODE button 134 may be selected to acquire a PIN code to be used for registering printer information. When the user selects the DISPLAY CODE button 134, a PIN code is displayed on the display 76.

That is, when the user selects the DISPLAY CODE button 134 in the registration information page 130 (M134), the PC 70 requests the information management server 50 to issue a PIN code (M136). Upon receiving this request to issue a PIN code, the information management server 50 issues a PIN code and records information related to the PIN code, i.e., the code information, in the data storage area 62 as account data (M137). As a result, the user information (account name, password, address, full name, and payment information) and the code information are stored in association with each other as account data. Note that the printer information has yet to be stored as account data at this stage.

After issuing the PIN code (M137), the information management server 50 creates information of a page for displaying the PIN code on the display 76 (hereinafter called a "code displaying page") and transmits the code displaying page information to the PC 70 (M138). Upon receiving the code displaying page information, the PC 70 displays a code displaying page 170 shown in FIG. 16 on the display 76 based on the page information (M140). Within the code displaying page 170 is displayed code information 172. The user then uses the PIN code indicated in the code information 172 to register printer information for the printer 10 on the information management server 50.

More specifically, a connection screen 180 shown in FIG. 17 is displayed on the display 16 of the printer 10. A CONNECT button 182 is displayed in the connection screen 180. When the user selects the CONNECT button 182 (M142: YES), the printer 10 issues a request to the information management server 50 for code registration screen information (M144). Upon receiving this request, the information management server 50 transmits the code registration screen information to the printer 10 (M146). Upon receiving the code registration screen information, the printer 10 displays a code registration screen 190 shown in FIG. 18 on the display 16 based on the information received from the information management server 50 (M148).

A text entry box 192 and a REGISTER button 194 are displayed in the code registration screen 190. The text entry box 192 is a field for inputting a PIN code. When the user of the printer 10 inputs the PIN code indicated in the code information 172, which was displayed in the code displaying page 170 in M140, in the text entry box 192 and selects the REGISTER button 194, the printer 10 transmits information related to the PIN code inputted into the text entry box 192, i.e., the code information, to the information management server 50. At this time, the printer 10 transmits its serial number and product name together with the code information to the information management server 50 (M150).

Upon receiving the code information, serial number, and product name, the information management server 50 extracts the account data that includes a PIN code matching the code information from the data storage area 62 and stores this account data in association with the serial number and product name in the data storage area 62 as the printer information (M152). Through this stage, the user information (account name, password, address, full name, and payment information), code information, and printer information are stored in association with each other as account data, as shown in FIG. 14.

Information for four printers has been registered in the account data shown in FIG. 14. Of this printer information, the printer information labeled "DEV22222222" is the information related to the printer 10. That is, printer information "DEV22222222" was registered by the printer with the serial number and product name transmitted in M150. Further, the printer information "DEV22222223", printer information "DEV22222232", and printer information "DEV22222252" were previously registered. In other words, the user that has registered the printer 10 had previously entered an agreement for fixed-rate printing with three other printers different from the printer 10.

The information for each printer also correlates service information and printing information with the serial number and product name. Service information indicates the status of the fixed-rate printing service, and specifically is set to one of "pending start," "active," "inactive," and "pending termination." Pending start is the status indicating that a request to enter an agreement for fixed-rate printing has been received, but the agreement has not yet been finalized. In this state, the service for fixed-rate printing is on hold. Active (an example of the claimed first status) is a status indicating that the agreement has been finalized and the fixed-rate printing service is now available. Inactive (an example of the claimed second status) is the status prior to entering an agreement for fixed-rate printing or after an agreement has been canceled in which the fixed-rate printing service is unavailable. Pending termination (an example of the claimed third status) is a status indicating that a request to cancel the agreement for fixed-rate printing has been received, but the agreement has not yet been canceled. In this status, the fixed-rate printing service is still available.

Thus, the printer corresponding to printer information "DEV22222222" cannot execute fixed-rate printing processes as an agreement for such fixed-rate printing has not yet been entered or has already been canceled. The printer corresponding to printer information "DEV22222223" can be used for fixed-rate printing processes, as an agreement for such fixed-rate printing has been entered. The printer corresponding to printer information "DEV22222232" cannot execute fixed-rate printing processes, even though the user of the printer has requested to enter an agreement for fixed-rate printing, because either the special cartridges have not yet been delivered or the special cartridges have been delivered but have not yet been connected to the connector 24 of the printer. The printer corresponding to printer information "DEV22222252" is able to execute fixed-rate printing processes despite the user of the printer having requested to cancel the agreement for fixed-rate printing because the procedure for canceling the agreement has not yet been completed. The printing information mentioned above is related to printing processes executed under the fixed-rate printing service and will be described later in greater detail.

After registering printer information on the information management server 50 in this way, the user once again logs in to the information management server 50 using the PC 70. In other words, when the user accesses the information management server 50 with the PC 70, the PC 70 displays the top page 100 on the display 76 (M104 in FIG. 2). Since the user now has an account registered on the information management server 50, the user can select the Log In button 102 in the top page 100 (M106: LOG IN BUTTON OPERATED). When the user performs this operation, the PC 70 issues a request to the information management server 50 for login page information (M118). In response to this request, the information management server 50 transmits login page information to the PC 70 (M120). Upon receiving the login page information, the PC 70 displays a login page 200 shown in FIG. 19 on the display 76 based on the received information (M122).

Two text entry boxes 202 and 204 and a Log In button 206 are displayed in the login page 200. The text entry boxes 202 and 204 are fields for inputting a registered account name and password. Once the user has inputted a registered account name and password in the text entry boxes 202 and 204 and has operated the LOG IN button 206 (M124), the PC 70 transmits the information inputted into the text entry boxes 202 and 204 (hereinafter called the "login information") to the information management server 50 (M126). Upon receiving the login information, the information management server 50 extracts the account data that includes this login information (M128).

Figure 3:
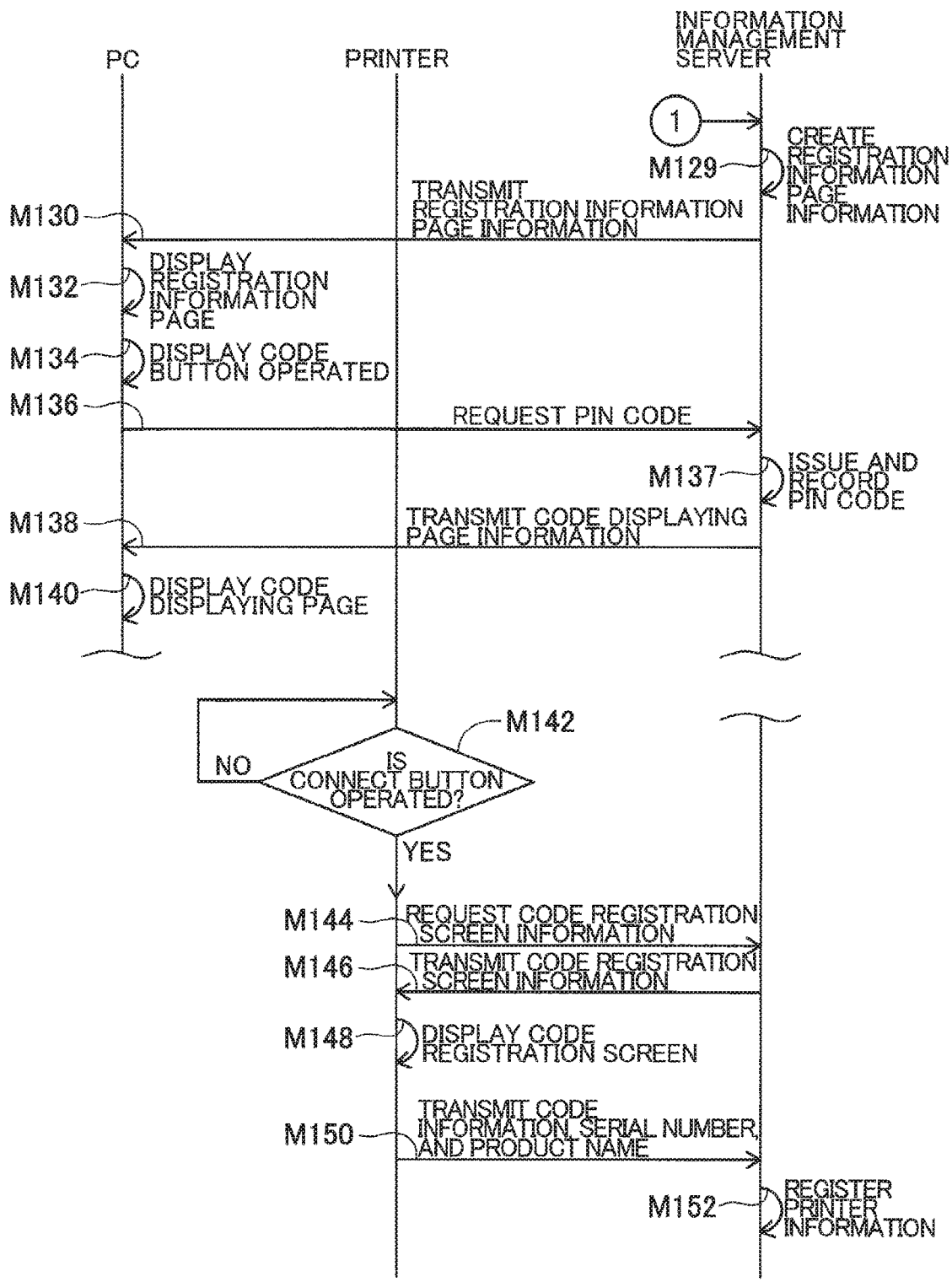
FIG. 3 is a sequence chart illustrating the operating state of the communication system according to the embodiment.
Figure 4:
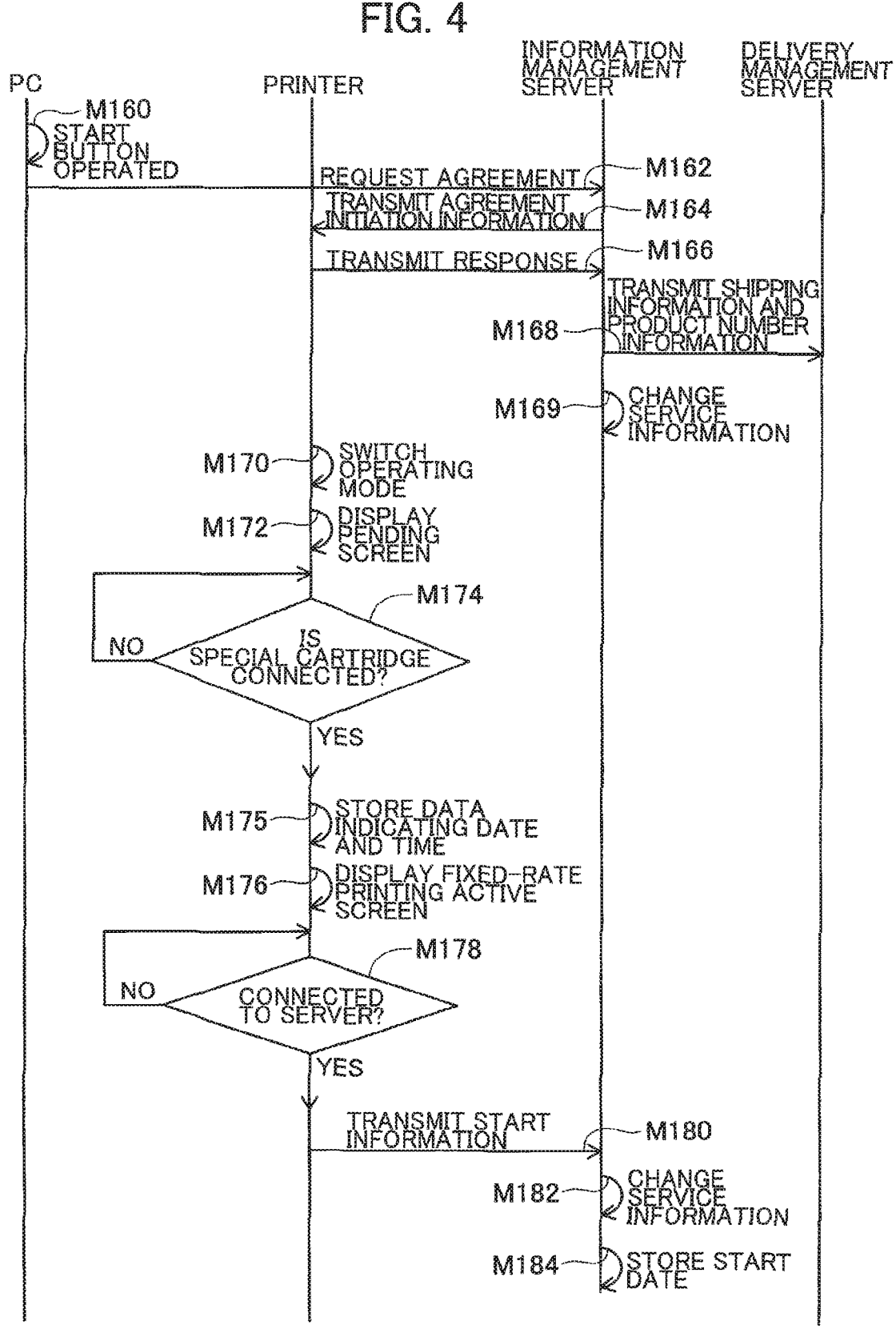
FIG. 4 is a sequence chart illustrating the operating state of the communication system according to the embodiment.
Figure 5:
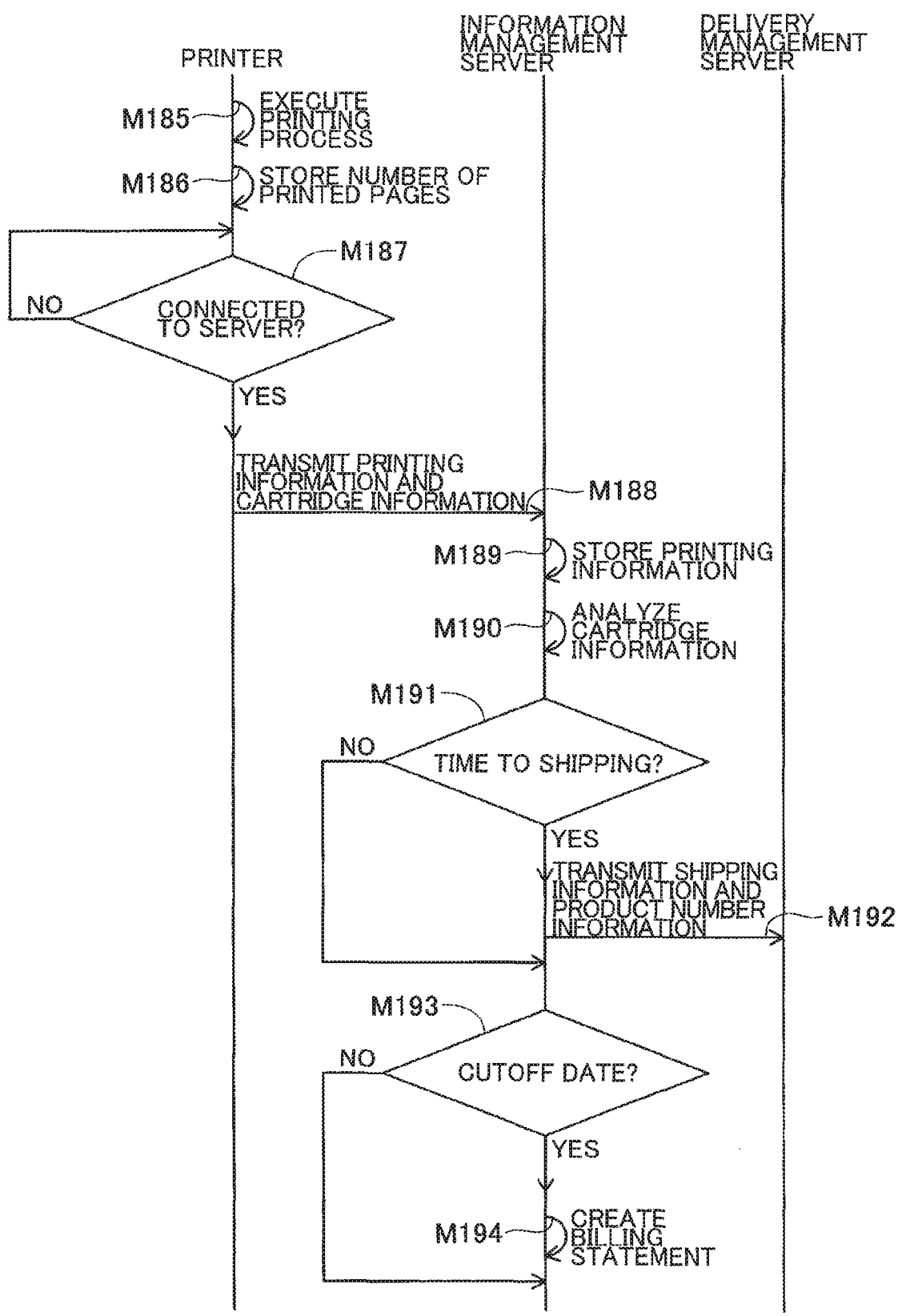
FIG. 5 is a sequence chart illustrating the operating state of the communication system according to the embodiment.
Figure 6:
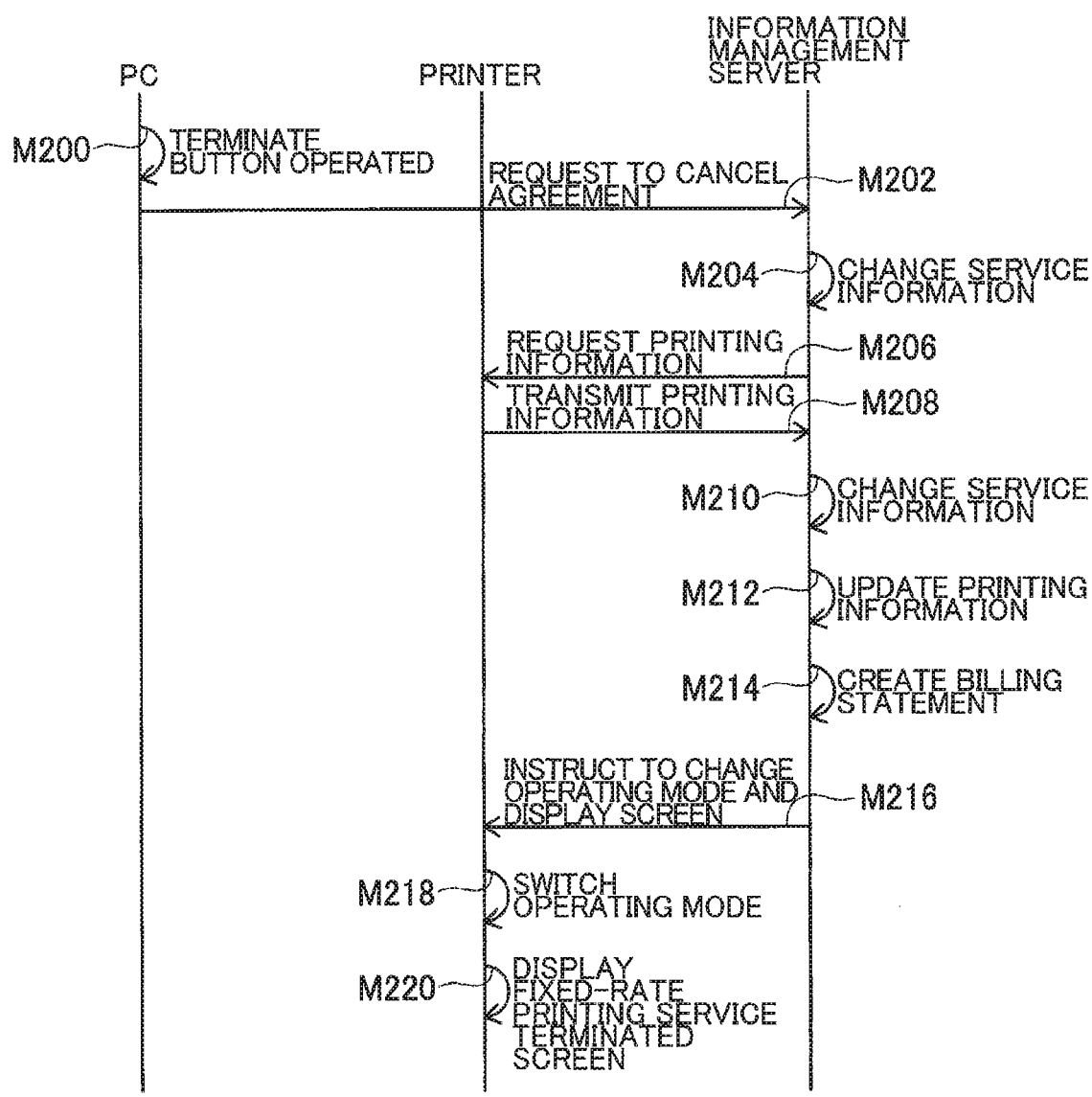
FIG. 6 is a sequence chart illustrating the operating state of the communication system according to the embodiment.

After extracting the account data, the information management server 50 creates registration information page information based on the account data (M129 in FIG. 3). The information management server 50 then transmits the newly created registration information page information to the PC 70 (M130), and the PC 70 displays the registration information page 130 on the display 76 based on the information received from the information management server 50 (M132). However, when the registration information page 130 shown in FIG. 15 was previously displayed on the display 76, only user information had been registered as account data on the information management server 50, while the code information and printer information had not been registered. Hence, only information corresponding to the user information is displayed in the registration information page 130 of FIG. 15.

However, when the registration information page 130 is displayed on the display 76 this time, the account data includes the user information (account name, password, address, full name, and payment information) stored in association with code information and printer information, as shown in FIG. 14. Hence, the information displayed in the registration information page 130 corresponds to the user information and printer information in this account data. FIG. 20 shows the registration information page 130 displayed on the display 76 in this case. As with the registration information page 130 in FIG. 15, the registration information page 130 in FIG. 20 includes the USER INFORMATION button 132 and DISPLAY CODE button 134, but also includes printer information 210, selection buttons 212 associated with the printer information 210, and a DISPLAY USAGE INFORMATION button 214.

Since information for four printers has been registered in the account data shown in FIG. 14, the information for these four printers is displayed in the printer information 210 of the registration information page 130. The selection buttons 212 are displayed based on the service information in the printer information 210. For example, the selection button 212 displayed next to the printer information 210 having service information "inactive" is a START button 212a. The START button 212a offers the user an opportunity to enter an agreement for fixed-rate printing. In other words, the user has not yet entered an agreement for fixed-rate printing on the printer 10 corresponding to the printer information 210 whose service information is inactive. When the user selects the START button 212a (M160 in FIG. 4), the PC 70 transmits a request to the information management server 50 to enter an agreement for fixed-rate printing (M162). Note that the PC 70 transmits printer information corresponding to the Start button 212a to the information management server 50 together with the agreement request.

Upon receiving the request to enter an agreement for fixed-rate printing, the information management server 50 transmits agreement initiation information for the fixed-rate printing service to the printer 10 identified by the printer information received together with the agreement request (M164). The agreement initiation information includes a command to change the operating mode of the printer 10, and a command to display a screen indicating that the service is in a pending start state. Upon receiving this agreement initiation information, the printer 10 transmits a response to the information management server 50 confirming that the information was received (M166). Upon receiving this response from the printer 10, the information management server 50 transmits shipping information and cartridge product number information to the delivery management server 90 (M168). The shipping information relates to the full name and address in the user information included in the account data. In this way, special cartridges identified by the product number information are shipped to the user identified by the shipping information. The information management server 50 also changes the service information in the account data corresponding to the printer information received together with the agreement request from inactive to pending start (M169).

Figure 21:
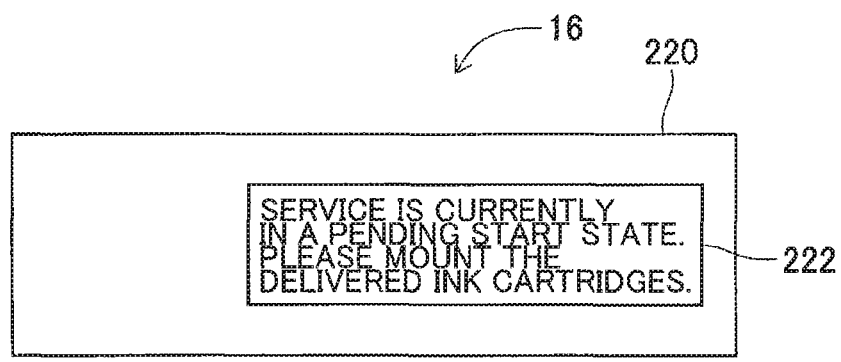
FIG. 21 is a schematic diagram illustrating a pending screen displayed on the display of the printer.

Upon receiving the agreement initiation information from the information management server 50, the printer 10 switches its operating mode from the second mode to the first mode (M170). In other words, prior to selecting the Start button 212a in the registration information page 130 displayed on the PC 70, the user of the PC 70 executed only normal printing processes on the printer 10 since the user had no agreement to perform fixed-rate printing. Thus, operations of the printer 10 were controlled according to the second mode. By selecting the START button 212a in the registration information page 130 displayed on the PC 70, the user of the PC 70 enters an agreement for fixed-rate printing. Accordingly, the operating mode of the printer 10 is switched to the first mode. At this time, the printer 10 displays the pending screen 220 shown in FIG. 21 on the display 16 (M172). The pending screen 220 includes a dialog box 222 indicating that the service is currently in a pending start state and instructing the user to connect the special cartridges to the connector 24 when they are delivered.

Figure 22:
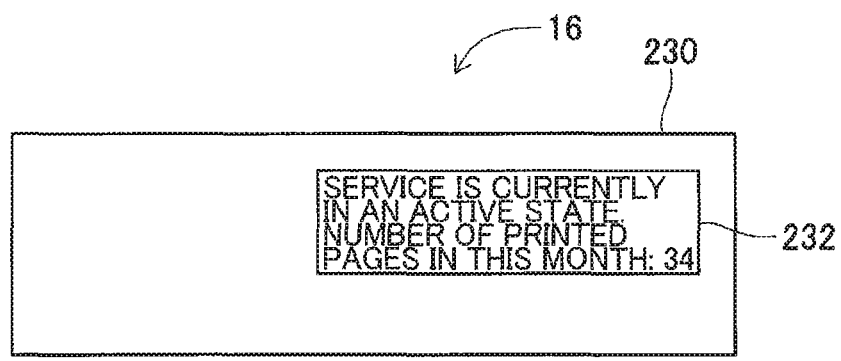
FIG. 22 is a schematic diagram illustrating a fixed-rate printing active screen displayed on the display of the printer.

When the pending screen 220 is displayed on the display 16, the printer 10 determines whether a special cartridge has been connected to the connector 24 (M174). If a special cartridge is connected to the connector 24 (M174: YES), then the printer 10 stores data in the data storage area 32 indicating the date and time at which the special cartridges were connected to the connector 24 (M175) because the prescribed period begins when a special cartridge is first connected to the connector 24. At this time, the printer 10 also displays a fixed-rate printing active screen 230 shown in FIG. 22 on the display 16 (M176). The fixed-rate printing active screen 230 includes a dialog box 232 showing that the status of the service for fixed-rate printing is active and indicating the number of pages that have been printed in fixed-rate printing processes. In this way, the user can be aware that fixed-rate printing processes can be executed.

Next, the printer 10 determines whether communication with the information management server 50 is possible (M178). If the printer 10 is unable to communicate with the information management server 50 (M178: NO), the printer 10 waits until communication with the information management server 50 is possible. When communication with the information management server 50 is possible (M178: YES), the printer 10 transmits start information to the information management server 50 (M180). The start information includes the date and time at which the special cartridges were connected to the connector 24. The printer 10 also transmits its serial number to the information management server 50 together with the start information. Upon receiving the start information, the information management server 50 changes the service information in the account data corresponding to the serial number received with the start information from "pending start" to "active" (M182). The information management server 50 also stores the account data corresponding to the serial number received with the start information together with the date and time included in the start information at which the special cartridges were connected to the connector 24, i.e., the date and time at which the fixed-rate printing service became active (hereinafter called the "start date"; M184).

The above description covers the case in which the user selects the START button 212a in the registration information page 130 shown in FIG. 20, i.e., when the user enters an agreement for fixed-rate printing. Thereafter, a fixed-rate printing process may be executed on the printer 10 according to this agreement (M185 in FIG. 5). Here, the printer 10 stores the number of pages printed in the data storage area 32 each time a fixed-rate printing process is executed (M186). Next, the printer 10 attempts to connect to the information management server 50 to communicate with the same. While the printer 10 is not connected to the information management server 50 (M187: NO), the printer 10 repeatedly attempts to connect to the information management server 50 until communication is established. Once the printer 10 has connected to the information management server 50 (M187: YES), the printer 10 transmits printing information and cartridge information to the information management server 50 (M188). The printing information is information stored in the data storage area 32 related to the number of pages printed in fixed-rate printing processes. The cartridge information is ID information for the cartridges 38 acquired by the readers 46 that is correlated with information related to amounts of residual ink detected by the sensors 27.

Upon receiving the printing information and cartridge information, the information management server 50 stores the number of printed pages indicated in the printing information in the data storage area 62 of the information management server 50 (M189). The information management server 50 also analyzes the cartridge information (M190). Based on the results of this analysis, the information management server 50 determines whether it is time to ship cartridges (M191). More specifically, the information management server 50 determines whether the remaining quantities of ink are less than a threshold amount based on the information related to residual ink quantities included in the cartridge information. The information management server 50 determines that it is time to ship cartridges when the residual ink quantities are smaller than the threshold amount. When the information management server 50 determines that it is time to ship cartridges (M191: YES), the information management server 50 transmits shipping information and product number information for the cartridges to the delivery management server 90 (M192). Note that the product number information is identified by identification information included in the cartridge information. Based on this information, replacement cartridges corresponding to those having low residual ink quantities are shipped to the user identified by the shipping information. If it is not time to ship cartridges (M191: NO), the information management server 50 skips step M192.

Next, the information management server 50 determines whether the current date is the cutoff date of the prescribed period in the agreement for fixed-rate printing (M193). If the current date is the cutoff date (M193: YES), the information management server 50 creates a billing statement for the fixed-rate printing processes (M194). Specifically, for each prescribed period of the fixed-rate printing service, the user can execute printing processes for a preset number of pages at a fixed cost. Accordingly, the information management server 50 identifies the number of printed pages based on printing information for the period from the previous cutoff date to the updated date for printing information that was stored in M189. Then the information management server 50 determines whether the number of pages printed in this period exceeds the preset number. If the number of printed pages in the latest printing information does not exceed the preset number, the information management server 50 calculates a billing amount equivalent to the period from the previous cutoff date for the fixed-rate printing service to the updated date of printing information updated in M189. However, if the number of printed pages in the latest printing information exceeds the preset number, the information management server 50 calculates the billing amount by adding an amount corresponding to the number of pages over the preset number to the amount corresponding to the agreement for fixed-rate printing. Note that if the information management server 50 determines in M193 that the current date is not the cutoff date for the prescribed agreement (M193: NO), the information management server 50 skips the process of M194, and the process returns to M185.

Here, the method of canceling an agreement for fixed-rate printing will be described. In the registration information page 130 shown in FIG. 20, one of the selection buttons 212 is a Terminate button 212*b* displayed in association with printer information 210 for which the service information is "active." The TERMINATE button 212*b* is selected to cancel an agreement for fixed-rate printing. That is, the user has entered an agreement for fixed-rate printing on the printer corresponding to printer information 210 whose service information is "active" and, thus, the printer can be used to execute fixed-rate printing processes. When the user selects the TERMINATE button 212*b* (M200 in FIG. 6), the PC 70 sends a request to the information management server 50 to cancel the agreement for fixed-rate printing (M202). Note that the PC 70 also transmits the printer information corresponding to the TERMINATE button 212*b* to the information management server 50 together with the cancellation request.

Upon receiving the request to cancel an agreement for fixed-rate printing, the information management server 50 changes the service information in the account data corresponding to the printer information received with the cancellation request from "active" to "pending termination" (M204). Also upon receiving the cancellation request, the information management server 50 transmits a request for printing information to the printer 10 identified in the printer information received with the cancellation request (M206). The printing information relates to the number of pages printed on the printer 10 in fixed-rate printing. While this will be described later in greater detail, the printer 10 counts the number of pages each time a fixed-rate printing process is executed. Upon receiving a request for printing information, the printer 10 transmits the printing information to the information management server 50 (M208). Note that the printer 10 transmits its serial number to the information management server 50 together with the printing information.

Upon receiving the printing information, the information management server 50 changes the service information in the account data corresponding to the serial number received with the printing information from "pending termination" to "inactive" (M210). Also upon receiving the printing information, the information management server 50 updates the printing information in the account data corresponding to the serial number to the received printing information (M212). As shown in FIG. 14, the printing information in account data includes the number of pages printed in fixed-rate printing processes, and the date and time at which printing information was received from the printer 10. Accordingly, the printer 10 identifies the number of printed pages based on the received printing information and stores the identified number of pages together with the date and time at which the printing information was received in the account data as printing information.

After updating the printing information, the information management server 50 creates a billing statement for the fixed-rate printing service based on the latest updated printing information. More specifically, fixed-rate printing is a service in which the printer can print a preset number of pages at a fixed cost in each prescribed period. Thus, the information management server 50 calculates the billing amount based on printing information for the period beginning from the last cutoff date in the printing information that was updated in M214. Next, the information management server 50 determines whether the number of pages printed during this period exceeds the preset number. If the number of pages in the latest printing information does not exceed the preset number, the information management server 50 calculates a billing amount corresponding to the period from the previous cutoff date for fixed printing to the updated date for printing information updated in M214. However, if the number of printed pages in the latest printing information exceeds the preset number, the information management server 50 calculates a billing amount by adding a fee corresponding to the number of printed pages exceeding the preset number to the cost corresponding to the agreement for fixed-rate printing.

Figure 23:
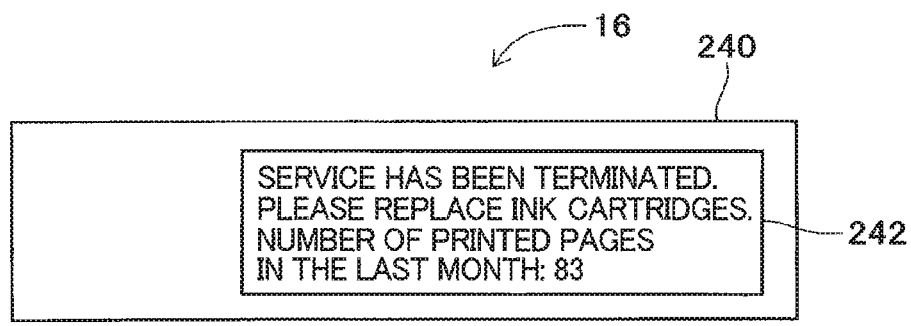
FIG. 23 is a schematic diagram illustrating a fixed-rate printing service terminated screen displayed on the display of the printer.

After creating the billing statement, the information management server 50 transmits instructions to the printer 10 identified by the serial number received with the printing information instructing the printer 10 to change its operating mode and display screen (M216). Upon receiving the changing instructions from the information management server 50, the printer 10 changes its operating mode from the first mode to the second mode (M218). Next, the printer 10 displays a fixed-rate printing service terminated screen 240 shown in FIG. 23 on the display 16 (M220). The fixed-rate printing service terminated screen 240 includes a dialog box 242 indicating that the fixed-rate printing service has been terminated and prompting the user to disconnect the special cartridges for fixed-rate printing from the connector 24 and mount normal cartridges in the connector 24. In this way, the user can recognize that the fixed-rate printing service has been terminated.

Further, in the registration information page 130 shown in FIG. 20, the selection buttons 212 include a CANCEL button 212c next to the printer information 210 whose service information is "pending start." The CANCEL button 212c is provided for canceling an agreement for fixed-rate printing after the user has requested to enter an agreement for fixed-rate printing on the printer associated with the printer information 210 whose service information is "pending start." At this time, the printer 10 is in a "pending start" state because the special cartridges have not been delivered to the user or the cartridges have been delivered but the user has not yet connected the cartridges to the connector 24. In this case, if the user selects the CANCEL button 212c, the PC 70 transmits a request to the information management server 50 to cancel the agreement for fixed-rate printing. Note that the PC 70 also transmits printer information associated with the CANCEL button 212c to the information management server 50 together with the cancellation request. Upon receiving the cancellation request, the information management server 50 changes the service information in the account data associated with the printer information received with this request from "pending start" to "inactive." Note that a selection button 212 is not displayed in the registration information page 130 shown in FIG. 20 in association with the printer information 210 whose service information is "pending termination."

The methods of entering and canceling agreements for fixed-rate printing and the like have been described above using sequence charts. Below, the process for canceling a fixed-rate printing service will be described using flowcharts. More specifically, the CPU 52 of the information management server 50 executes the control program 60 in order to perform a process for canceling a fixed-rate printing service. Next, steps in the process performed by the CPU 52 when executing the control program 60 will be described with reference to FIGS. 7 and 8.

Figure 7:
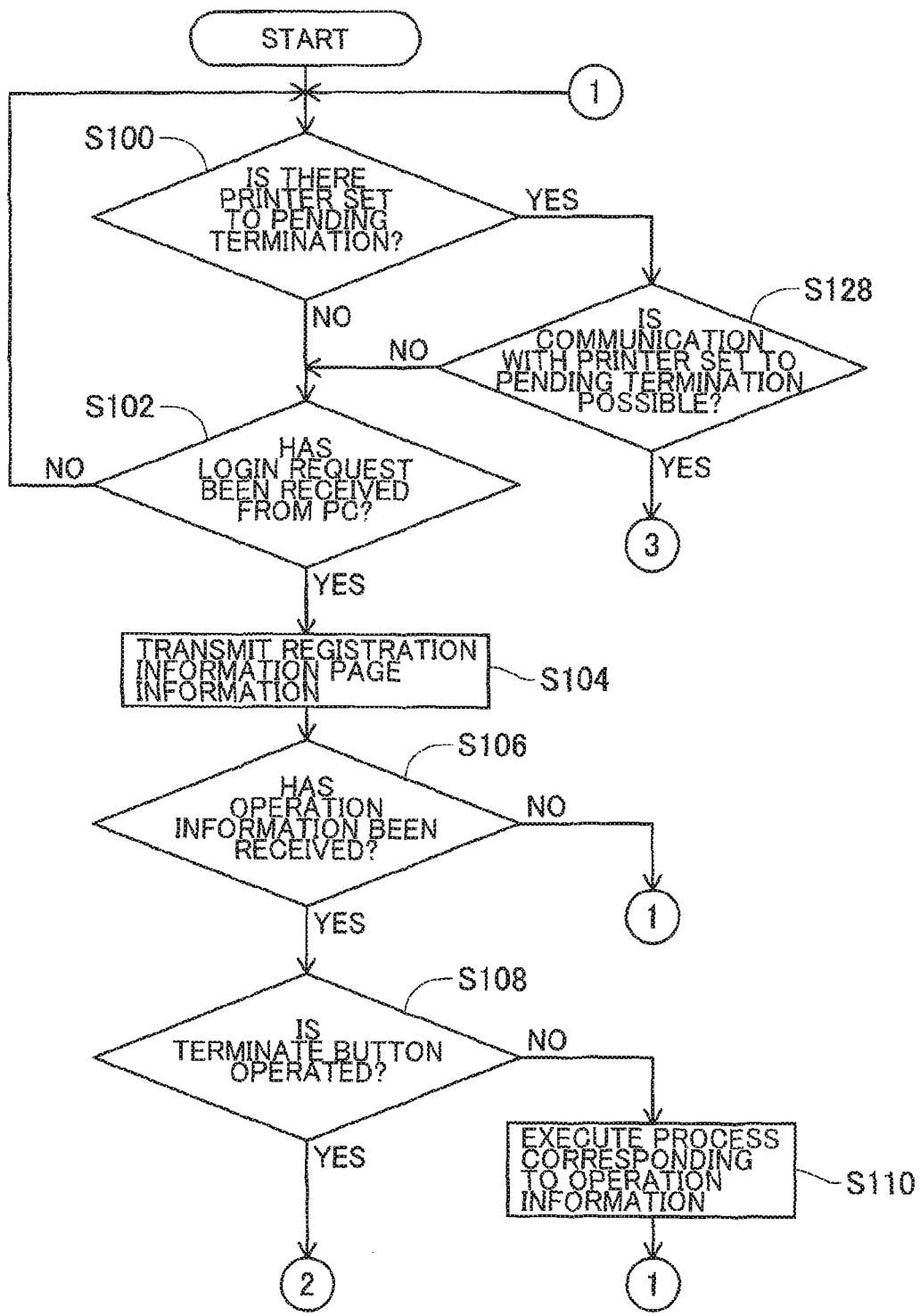
FIG. 7 is a flowchart illustrating steps in a process performed by a CPU of an information management server according to the embodiment.
Figure 8:
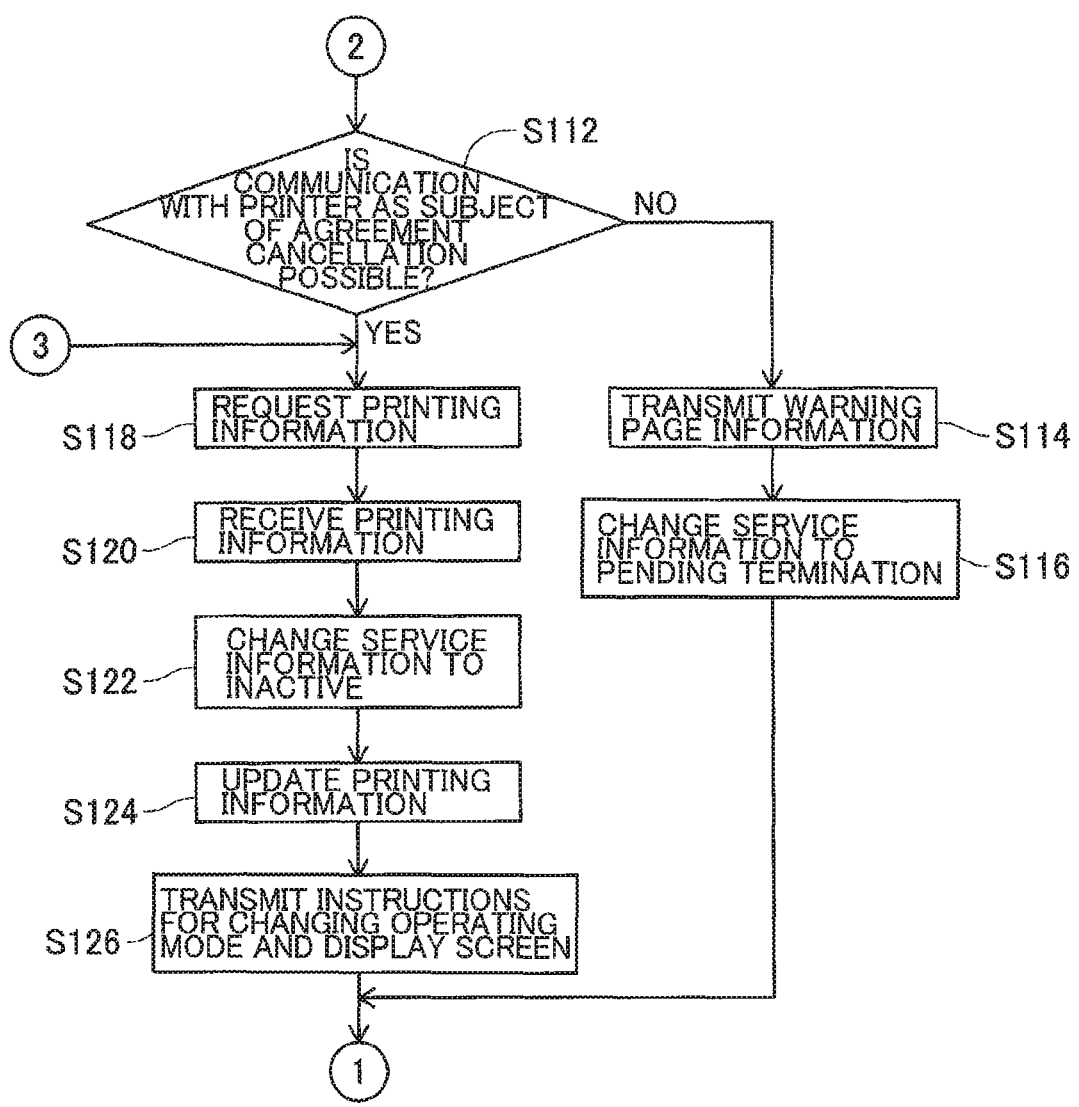
FIG. 8 is a flowchart illustrating steps in the process performed by the CPU of the information management server according to the embodiment.

When the CPU 52 of the information management server 50 executes the control program 60, in S100 of FIG. 7 the CPU 52 determines whether the service information in account data stored in the data storage area 62 of the information management server 50 includes a printer set to "pending termination." If there are no printers in the service information set to "pending termination" (S100: NO), in S102 the CPU 52 determines whether a login request has been received from the PC 70. If a login request has not been received from the PC 70 (S102: NO), the CPU 52 returns to S100. However, if a login request has been received from the PC 70 (S102: YES), in S104 the CPU 52 transmits the registration information page information, i.e., page information for displaying the registration information page 130 on the display 76 of the PC 70 to the PC 70.

In S106 the CPU 52 determines whether operation information has been received from the PC 70. Operation information is information that the PC 70 transmits when a button displayed in the registration information page 130 has been selected. If no operation information has been received from the PC 70 (S106: NO), the CPU 52 returns to S100. However, when operation information has been received from the PC 70 (S106: YES), in S108 the CPU 52 determines whether the operation information received from the PC 70 indicates that the TERMINATE button 212b was selected.

If the operation information received from the PC 70 was not transmitted due to the TERMINATE button 212b being selected (S108: NO), in S110 the CPU 52 executes the process corresponding to the selected button. That is, if the operation information was transmitted due to the START button 212a being operated, the CPU 52 executes a process corresponding to the START button 212a, and subsequently returns to S100. However, if the operation information received from the PC 70 was transmitted due to the TERMINATE button 212b being selected (S108: YES), then in S112 of FIG. 8 the CPU 52 determines whether it is possible to communicate with the printer selected using the TERMINATE button 212b as the subject of an agreement cancellation. More specifically, when transmitting operation information for the TERMINATE button 212b to the information management server 50, the PC 70 also transmits the printer information associated with the TERMINATE button 212b. Accordingly, the information management server 50 identifies the printer indicated by the printer information from the account data and determines whether it is possible to communicate with the identified printer.

Figure 24:
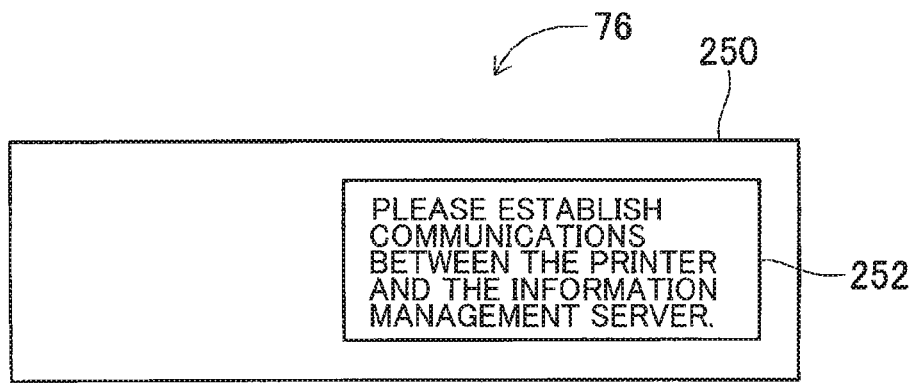
FIG. 24 is a schematic diagram illustrating a warning page displayed on the display of the PC.

If it is not possible to communicate with the printer in question (S112: NO), in S114 the information management server 50 transmits warning page information to the PC 70. Warning page information is provided for displaying a warning page 250 shown in FIG. 24 on the display 76 of the PC 70. The warning page 250 includes a text box 252 indicating that the information management server 50 cannot establish communications with the printer whose agreement for fixed-rate printing has been targeted for cancellation. Through this warning, the user is alerted to the fact that the information management server 50 cannot communicate with the printer in question. After the information management server 50 transmits the warning page information to the PC 70, in S116 the CPU 52 changes the service information for the printer in question to "pending termination" in the account data stored in the data storage area 62 of the information management server 50. Subsequently, the CPU 52 returns to S100.

On the other hand, if the CPU 52 determines in S112 that it is possible to communicate with the printer whose agreement for fixed-rate printing has been targeted for cancellation (S112: YES), in S118 the CPU 52 transmits a request for printing information to the printer 10 in question. In S120 the information management server 50 receives the printing information transmitted in response to the request. Upon receiving the printing information, in S122 the CPU 52 changes the service information for the printer in question to "inactive" in the account data stored in the data storage area 62 of the information management server 50. Also upon receiving the printing information, in S124 the CPU 52 updates the printing information in the account data stored in the data storage area 62 to the printing information received in S120. In S126 the CPU 52 transmits instructions for changing the operating mode and display screen to the printer in question, and subsequently returns to S100.

Further, if the CPU 52 determines in S100 of FIG. 7 that the service information in the account data includes a printer set to "pending termination" (S100: YES), in S128 the CPU 52 determines whether the information management server 50 can communicate with the printer whose status is set to "pending termination." If the information management server 50 is unable to communicate with the printer in question (S128: NO), the CPU 52 advances to S102 described above. However, if the information management server 50 is able to communicate with the printer in question (S128: YES), the process advances to S118 in FIG. 8.

In the process described above, the information management server 50 maintains the service information for a printer whose agreement has been targeted for cancellation at "pending termination," even after receiving operation information for the TERMINATE button 212b, i.e., after receiving a request to cancel the agreement for the printer in question until a request for printing information can be transmitted to the printer. The information management server 50 changes the service information for the printer whose agreement has been targeted for cancellation to "inactive" only after a request for printing information has been transmitted to the printer and a response has been received from the printer. After changing the service information for the printer in question to "inactive," the information management server 50 transmits instructions to change the operating mode to the printer in question. Thus, the service information for a printer whose agreement has been targeted for cancellation is changed to "inactive" at the same time the operating mode of the printer 10 is changed to the second mode, i.e., at the same time the printer 10 is prohibited from executing fixed-rate printing processes.

Accordingly, if the information management server 50 cannot communicate with the printer after a request to cancel an agreement with the printer has been received, the information management server 50 maintains the service information for the printer at "pending termination." Since the agreement for fixed-rate printing has not yet been canceled for a printer whose service information is "pending termination," the user of the printer is still billed for the amount corresponding to the fixed-rate printing service. However, when the information management server 50 can communicate with the printer after receiving a request to cancel an agreement with the printer, the information management server 50 prohibits the printer from executing fixed-rate printing processes and sets the service information for the printer to "inactive." Since the agreement for fixed-rate printing has been canceled for a printer whose service information is "inactive," the user of the printer is not billed for charges corresponding to the fixed-rate printing service after the agreement has been canceled. Thus, the information management server 50 can cancel the fixed-rate printing agreement at the same time the printer is prohibited from executing fixed-rate printing processes so that charges corresponding to the fixed-rate printing service can be billed appropriately.

The processes for entering and canceling an agreement for fixed-rate printing and the like have been described above. Next, fixed-rate printing processes and normal printing processes performed on the printer 10 will be described. Here, the CPU 12 of the printer 10 executes the control program 30 in order to implement the fixed-rate printing processes and normal printing processes on the printer 10. Next, steps in the processes implemented by executing the control program 30 will be described with reference to FIGS. 9 and 10.

Figure 9:
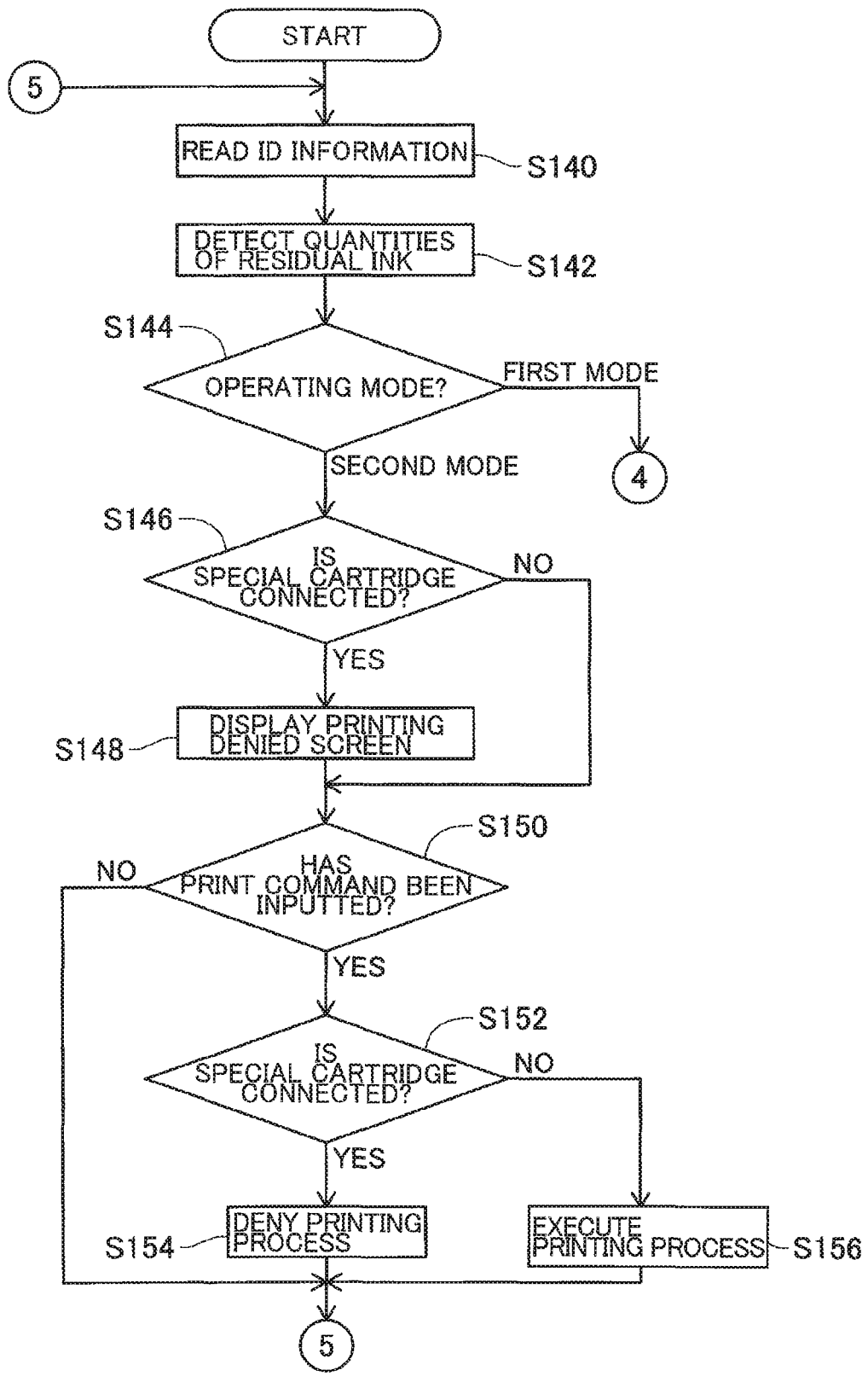
FIG. 9 is a flowchart illustrating steps in a process performed by a CPU of a printer according to the embodiment.
Figure 10:
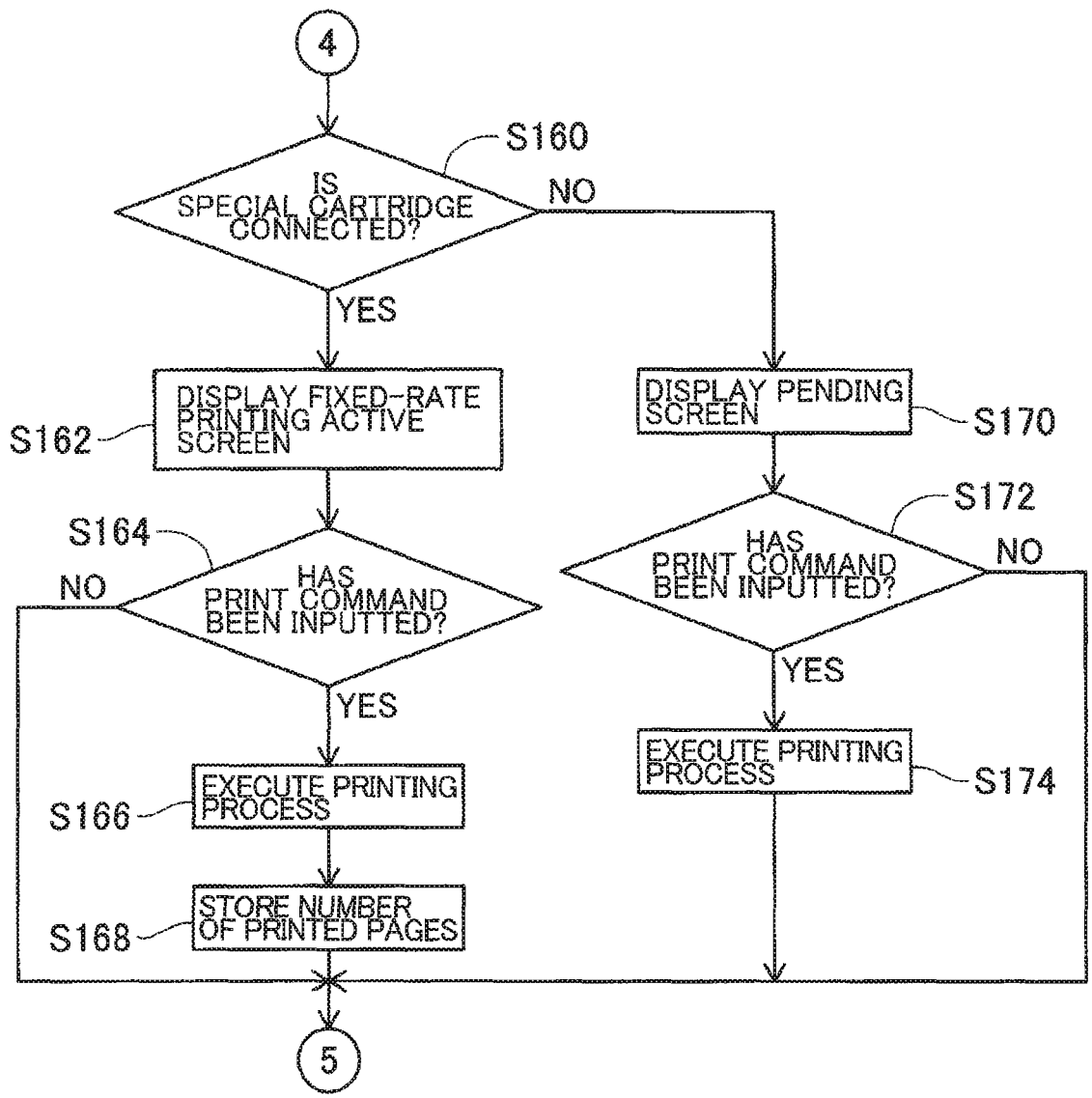
FIG. 10 is a flowchart illustrating steps in the process performed by the CPU of the printer according to the embodiment.

When executing the control program 30, in S140 of FIG. 9 the CPU 12 of the printer 10 controls the readers 46 to read ID information for the cartridges 38 connected to the connector 24. In S142 the CPU 12 controls the sensors 27 to detect the quantities of residual ink in the cartridges 38 connected to the connector 24. Here, the ID information and quantity of residual ink is detected for each of the cartridges 38 connected to the connector 24.

In S144 the CPU 12 determines whether the operating mode of the printer 10 is currently the second mode or the first mode. If the operating mode of the printer 10 is currently the second mode (S144: SECOND MODE), in S146 the CPU 12 determines whether at least one special cartridge 38 is connected to the connector 24. The CPU 12 determines whether a special cartridge 38 is connected to the connector 24 based on the ID information for the cartridges 38 read in S140.

If at least one special cartridge 38 is connected to the connector 24 (S146: YES), in S148 the CPU 12 displays a printing denied screen (not shown) on the display 16 of the printer 10. A message is displayed in the printing denied screen indicating that a printing process using special cartridges cannot be executed because the user of the printer 10 has not entered an agreement for fixed-rate printing. The process subsequently advances to S150. However, if there are no special cartridges 38 connected to the connector 24 (S146: NO), the CPU 12 skips the process of S148 and advances directly to S150. In other words, the CPU 12 does not display the printing denied screen on the display 16 when no special cartridges 38 are connected to the connector 24.

In S150 the CPU 12 determines whether a print command was inputted. If a print command was not inputted (S150: NO), the CPU 12 returns to S140. However, when a print command has been inputted (S150: YES), in S152 the CPU 12 determines whether at least one special cartridge 38 is connected to the connector 24. If at least one special cartridge 38 is connected to the connector 24 (S152: YES), in S154 the CPU 12 denies the printing process. In other words, the CPU 12 does not execute the printing process but returns to S140. However, if no special cartridges 38 are connected to the connector 24 (S152: NO), in S156 the CPU 12 executes the printing process and subsequently returns to S140.

Alternatively, when the CPU 12 determines in S144 that the operating mode of the printer 10 is the first mode (S144: FIRST MODE), in S160 of FIG. 10 the CPU 12 determines whether at least one special cartridge 38 is connected to the connector 24. When at least one special cartridge 38 is connected to the connector 24 (S160: YES), in S162 the CPU 12 displays the fixed-rate printing active screen 230 shown in FIG. 22 on the display 16. In S164 the CPU 12 determines whether a print command was inputted. If a print command was not inputted (S164: NO), the process returns to S140. However, if a print command has been inputted (S164: YES), in S166 the CPU 12 executes the printing process. In S168 the CPU 12 stores the number of pages printed in the printing process in the data storage area 32, and subsequently returns to S140.

Alternatively, if the CPU 12 determines in S160 that no special cartridges 38 are connected to the connector 24 (S160: NO), in S170 the CPU 12 displays the pending screen 220 shown in FIG. 21 on the display 16. In S172 the CPU 12 determines whether a print command was inputted. If a print command was not inputted (S172: NO), the process returns to S140. However, if a print command has been inputted (S172: YES), in S174 the CPU 12 executes the printing process, and subsequently returns to S140.

The printer 10 also changes its operating mode in response to instructions received from the information management server 50 to change the operating mode. Specifically, the CPU 12 of the printer 10 implements a process to change the operating mode of the printer 10 by executing the control program 30. Next, steps in the process implemented by executing the control program 30 will be described with reference to FIG. 11.

Figure 11:
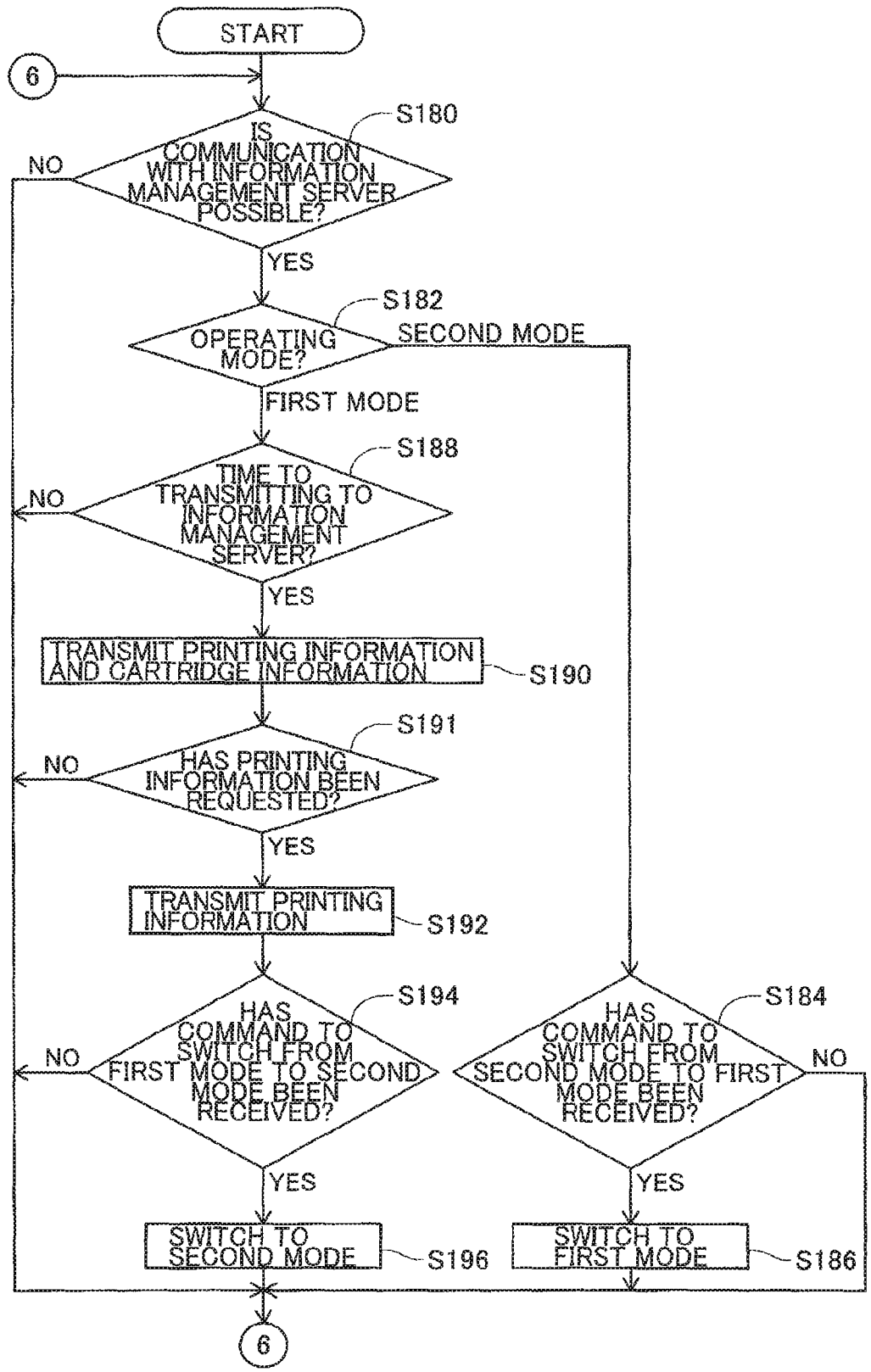
FIG. 11 is a flowchart illustrating steps in a process performed by the CPU of the printer according to the embodiment.

When executing the control program 30, in S180 of FIG. 11 the CPU 12 determines whether the printer 10 can communicate with the information management server 50. The CPU 12 repeatedly performs the process of S180 while communication with the information management server 50 is not possible (S180: NO). When the printer 10 can communicate with the information management server 50 (S180: YES), in S182 the CPU 12 determines whether the operating mode of the printer 10 is set to the second mode or the first mode.

When the operating mode of the printer 10 is set to the second mode (S182: SECOND MODE), in S184 the CPU 12 determines whether a command to switch the operating mode of the printer 10 from the second mode to the first mode was received. If a command to switch the operating mode was not received (S184: NO), the process returns to S180. However, if a command to switch the operating mode to the first mode was received (S184: YES), in S186 the CPU 12 changes the operating mode of the printer 10 to the first mode, and subsequently returns to S180.

Alternatively, when the operating mode of the printer 10 is set to the first mode (S182: FIRST MODE), in S188 the CPU 12 determines whether it is time to transmit printing information and the like to the information management server 50. If it is not currently time to transmit printing information and the like to the information management server 50 (S188: NO), the process returns to S180. However, if it is currently time to transmit printing information and the like to the information management server 50 (S188: YES), in S190 the CPU 12 transmits printing information and cartridge information from the printer 10 to the information management server 50. Here, the printing information is information related to the cumulative number of printed pages that were stored in the data storage area 32 in S168. The cartridge information is information correlating the ID information read in S140 with information related to the quantities of residual ink detected in S142.

In S191 the CPU 12 determines whether a request to transmit printing information was received. If a transmission request was not received (S191: NO), the CPU 12 returns to S180. However, if a request to transmit printing information was received (S191: YES), in S192 the CPU 12 transmits printing information from the printer 10 to the information management server 50. In S194 the CPU 12 determines whether a command was received to change the operating mode of the printer 10 from the first mode to the second mode. If a command to switch modes was not received (S194: NO), the process returns to S180. However, if a command to switch the operating mode from the first mode to the second mode was received (S194: YES), in S196 the CPU 12 changes the operating mode of the printer 10 to the second mode, and subsequently returns to S180.

While the description has been made in detail with reference to specific embodiment thereof, it would be apparent to those skilled in the art that many modifications and variations may be made therein without departing from the spirit and scope of the above described embodiment. As a specific example, the information management server 50 in the embodiment described above is configured of a single web server, but the information management server 50 may be configured of a plurality of web servers instead.

Fixed-rate printing described in the embodiment is a service that enables a printer to print a preset number of pages at a fixed cost for each prescribed period. However, the present disclosure may be applied to a service that enables the printer to execute printing processes using either a preset amount of ink or a preset number of ink cartridges at a fixed cost for each prescribed period.

Further, while the information management server 50 and the printer 10 exchange data with each other directly in the embodiment described above, these devices may transmit and receive data indirectly via the PC 70 or the like. In other words, the printer 10 may be connected to the PC 70 by a USB cable or a wired or wireless LAN, for example, enabling the printer 10 to exchange data with the information management server 50 via the PC 70.

In the embodiment described above, the information management server 50 requests printing information from the printer 10 and changes the service information to "inactive" upon receiving a response to this request. However, the information management server 50 may instead change the service information to "inactive" when a response to a request to change the operating mode or the like is received.

In the embodiment described above, the information management server 50 sets the service information to "pending termination" while a response to the request for printing information has not been received, but the information management server 50 may maintain the service information at "active" while a response to the request for printing information has not been received. In this case, the service information can be set only to three statuses, i.e., "active," "inactive," and "pending start."

In the embodiment described above, the control program 30 used to implement printing processes according to the first mode and second mode is stored on the printer 10, and the printer 10 executes a printing process based on one of the first mode and second mode based on instructions received from the information management server 50 to change the operating mode. However, the information management server 50 may transmit a control program to the printer 10 for overwriting the control program 30, and the printer 10 may execute a printing process based on the control program received from the information management server 50. For example, the printer 10 stores the control program 30 for executing printing processes in the second mode and, during normal printing, executes printing processes based on the control program 30. Upon receiving a request to enter an agreement for fixed-rate printing, in M164 the information management server 50 transmits a control program to the printer 10 for executing printing processes in the first mode, and the printer 10 executes the processes described in M170-M208 according to this control program. In other words, the printer 10 executes the processes in M170-M208 according to a control program received from the information management server 50 and executes processes other than those described in M170-M208 according to the control program 30 stored on the printer 10. In this variation of the embodiment, the processes described in S144 and S182 of FIGS. 9 and 11, respectively, are eliminated. The printer 10 simply executes printing processes in the first mode when a control program for the first mode is received from the information management server 50, and executes printing processes in the second mode when a control program has not been received from the information management server 50. Similarly, in S184 of FIG. 11 according to the variation, the CPU 12 determines whether a control program for executing printing processes in the first mode has been received rather than determining whether instructions for changing the mode have been received.

While the present embodiment describes a case in which the CPU 12, CPU 52, and the like execute the processes shown in FIGS. 3 through 11, these processes may be implemented by an ASIC or other logic integrated circuit rather than the CPU 12, CPU 52, and the like, or may be executed through a combination of CPUs, ASICs, and other logic integrated circuits.

What is claimed is:

1. A server comprising:
a storage configured to store status of a service agreement with an image-recording device, the service agreement being an agreement for delivering a specific type of cartridge attachable to the image-recording device, the status of the service agreement including a first status and a second status, the first status indicating that the service agreement is in force, the second status indicating that the service agreement has been canceled;
a communication interface; and
a processor,
wherein the storage stores instructions that, when executed by the processor, causing the server to:
output a delivery command to deliver the specific type of cartridge when a remaining quantity of recording material contained in the specific type of cartridge in use has reached a predetermined minimum under the first status of the service agreement stored in the storage;
receive a cancellation request of the service agreement with the image-recording device from an information processing device through the communication interface;
transmit a response request to the image-recording device through the communication interface in response to the cancellation request;
receive, from the image-recording device through the communication interface, a response to the response request;
transmit, to the image-recording device through the communication interface, a switch command to switch an operating mode of the image-recording device from a first mode to a second mode in response to the response from the image-recording device, the specific type of cartridge being available for the image-recording device in the first mode, the specific type of cartridge being unavailable for the image-recording device in the second mode; and
change the status of the service agreement stored in the storage to the second status in response to the response from the image-recording device.

2. The server according to claim 1, wherein the status of the service agreement further includes a third status indicating that the cancellation request has been received but the service agreement has not yet been canceled; and
wherein the instructions, when executed by the processor, cause the server further to change the status of the service agreement stored in the storage to the third status in response to the cancellation request.

3. The server according to claim 1, wherein the instructions, when executed by the processor, cause the server further to:
determine whether communication with the image-recording device through the communication interface is possible in response to the cancellation request;
retry, when it is determined that the communication with the image-recording device is impossible, checking whether the communication with the image-recording device is possible until the communication with the image-recording device is found possible; and
transmit the switch command to the image-recording device through the communication interface after the communication with the image-recording device is found possible.

4. The server according to claim 1, wherein the instructions, when executed by the processor, cause the server further to change the status of the service agreement stored in the storage to the first status in response to receiving a service agreement request through the communication interface; and
wherein a charge for cartridge delivering service is determined according to consumption information of the recording material contained in the specific type of cartridge consumed throughout an image recording process executed by the image-recording device during a period from a time instance at which the status of the service agreement stored in the storage is changed to the first status until a time instance at which the status of the service agreement stored in the storage is changed to the second status.

5. The server according to claim 4, wherein a number of recorded pages in the image recording process is regarded as the consumption information of the recording material contained in the specific type of cartridge.

6. A system comprising a server and an image-recording device selectively operable in a plurality of operating modes,
wherein the server comprises:
a first storage configured to store status of a service agreement with the image-recording device, the service agreement being an agreement for delivering a specific type of cartridge attachable to the image-recording device, the status of the service agreement including a first status and a second status, the first status indicating that the service agreement is in force, the second status indicating that the service agreement has been canceled;
a first communication interface; and
a processor,
wherein the image-recording device comprises:
a connector to which the specific type of cartridge is detachably attachable;
a recorder configured to record an image onto a recording medium by making recording material adhere onto the recording medium;

a second storage;
a second communication interface; and
a controller,
wherein the first storage stores instructions that, when executed by the processor, cause the server to:
output a delivery command to deliver the specific type of cartridge when a remaining quantity of the recording material contained in the specific type of cartridge in use has reached a predetermined minimum under the first status of the service agreement stored in the first storage;
receive a cancellation request of the service agreement with the image-recording device from an information processing device through the first communication interface;
transmit a response request to the image-recording device through the first communication interface in response to the cancellation request;
receive, from the image-recording device through the first communication interface, a response to the response request;
transmit, to the image-recording device through the first communication interface, a switch command to switch an operating mode of the image-recording device from a first mode to a second mode in response to the response from the image-recording device, the specific type of cartridge being available for the image-recording device in the first mode, the specific type of cartridge being unavailable for the image-recording device in the second mode; and
change the status of the service agreement stored in the first storage to the second status in response to the response from the image-recording device,
wherein the controller of the image-recording device is configured to:
store, in the second storage, consumption information of the recording material contained in the specific type of cartridge attached to the connector;
transmit the consumption information stored in the second storage through the second communication interface;
receive the response request from the server through the second communication interface;
transmit, to the server through the second communication interface, the response to the response request; and
switch the operating mode from the first mode to the second mode in response to the switch command received from the second communication interface.

7. The system according to claim 6, wherein the instructions, when executed by the processor, cause the server further to change the status of the service agreement stored in the first storage to the first status in response to receiving a service agreement request through the first communication interface; and
wherein a charge for cartridge delivering service is determined according to the consumption information of the recording material contained in the specific type of cartridge consumed throughout an image recording process executed by the image-recording device during a period from a time instance at which the status of the service agreement stored in the first storage is changed to the first status until a time instance at which the status of the service agreement stored in the first storage is changed to the second status.

8. The system according to claim 6, wherein a general type of cartridge is detachably attachable to the connector of the image-recording device, the recorder being capable of recording an image onto a recording medium using recording material contained in the general type of cartridge attached to the connector, the general type of cartridge and the specific type of cartridge both being usable in recording images on the recording medium, the general type of cartridge and the specific type of cartridge being distinct in that the specific type of cartridge is governed by the controller whereas the general type of cartridge is not governed by the controller.

9. The server according to claim 1, wherein the instructions, when executed by the processor, cause the server further to transmit, to the image-recording device through the communication interface, a transmission request of printing information as part of the response request, the printing information indicating a number of sheets printed on the image-recording device under the first status of the service agreement stored in the storage.

10. The system according to claim 6, wherein the instructions, when executed by the processor, cause the server further to:
transmit, to the image-recording device through the first communication interface, a transmission request of printing information as part of the response request, the printing information indicating a number of sheets printed on the image-recording device under the first status of the service agreement stored in the first storage; and
receive the printing information from the image-recording device through the first communication interface.

11. A server comprising:
a storage configured to store status of a service agreement with an image-recording device, the service agreement being an agreement for delivering a specific type of cartridge attachable to the image-recording device, the status of the service agreement including a first status and a second status, the first status indicating that the service agreement is in force, the second status indicating that the service agreement has been canceled;
a communication interface; and
a processor,
wherein the storage stores instructions that, when executed by the processor, causing the server to:
output a delivery command to deliver the specific type of cartridge when a remaining quantity of recording material contained in the specific type of cartridge in use has reached a predetermined minimum under the first status of the service agreement stored in the storage;
receive a cancellation request of the service agreement with the image-recording device from an information processing device through the communication interface;
determine whether communication with the image-recording device through the communication interface is possible in response to the cancellation request;
in response to determining that communication with the image-recording device through the communication interface is possible:
transmit a response request to the image-recording device through the communication interface in response to the cancellation request;
receive, from the image-recording device through the communication interface, a response to the response request;

transmit, to the image-recording device through the communication interface, a switch command to switch an operating mode of the image-recording device from a first mode to a second mode in response to the response from the image-recording device, the specific type of cartridge being available for the image-recording device in the first mode, the specific type of cartridge being unavailable for the image-recording device in the second mode; and change the status of the service agreement stored in the storage to the second status in response to the response from the image-recording device.

12. The server according to claim 11, wherein the instructions, when executed by the processor, cause the server further to:

transmit information to a device other than the image-recording device through the communication interface when it is determined that the communication with the image-recording device through the communication interface is impossible after the cancellation request is received, the information indicating that communication between the image-recording device and the server is impossible.

13. The server according to claim 11, wherein the instructions, when executed by the processor, cause the server further to:

retry, when it is determined that the communication with the image-recording device is impossible, checking whether the communication with the image-recording device is possible until the communication with the image-recording device is found possible; and transmit the switch command to the image-recording device through the communication interface after the communication with the image-recording device is found possible.

* * * * *